United States Patent [19]
Baumoel

[11] Patent Number: 5,343,737
[45] Date of Patent: Sep. 6, 1994

[54] METHOD AND APPARATUS FOR LEAK DETECTION AND PIPELINE TEMPERATURE MODELLING METHOD AND APPARATUS

[76] Inventor: Joseph Baumoel, 155 Plant Ave., Hauppauge, N.Y. 11788

[21] Appl. No.: 949,076

[22] Filed: Sep. 22, 1992

[51] Int. Cl.$^5$ .............................. G01M 3/28
[52] U.S. Cl. ........................ 73/40.50 R; 73/861.28
[58] Field of Search .......... 73/40.5 R, 40.5 A, 861.28

[56] References Cited

U.S. PATENT DOCUMENTS

| | | | |
|---|---|---|---|
| 3,667,285 | 6/1972 | Wright et al. | 73/40.5 R |
| 3,690,150 | 9/1972 | Mullen | 73/40.5 R |
| 3,711,689 | 1/1973 | Park | 73/40.5 R X |
| 4,066,095 | 1/1978 | Massa | 73/40.5 A X |
| 4,090,179 | 5/1978 | Hirano | 73/40.5 R X |
| 4,308,746 | 1/1982 | Covington | 73/40.5 R |
| 4,498,809 | 2/1985 | Farmer | 405/92 |
| 4,727,748 | 3/1988 | Horigome et al. | 73/40.5 R X |
| 4,796,466 | 1/1989 | Farmer | 73/40.5 R |
| 4,838,127 | 6/1989 | Herremans et al. | 73/861.28 |
| 4,856,321 | 8/1989 | Smalling et al. | 73/40.5 A |

*Primary Examiner*—Hezron E. Williams
*Assistant Examiner*—Joseph W. Roskos
*Attorney, Agent, or Firm*—Ostrolenk, Faber, Gerb & Soffen

[57] ABSTRACT

A method and apparatus of leak detection for a pipeline. The method includes dividing the pipeline into a plurality of segments, a first site station provided at the beginning of each segment and a second site station provided at the end of each segment, dividing each segment of the pipeline into a plurality of hypothetical pipeline sections, each section having the same nominal volume, measuring the liquid flow into the first section and determining a volume of liquid that has passed the first site station for a defined period, measuring the temperature of the liquid entering the first section at the first site station, measuring the liquid flow out of the last pipeline section of the segment and determining a volume of liquid that has passed the second site station for the defined period, measuring the temperature of the liquid leaving the last section at the second site station, measuring the temperature of the ambient to the pipeline at the first site station or that representative of the topography of the segment, measuring the temperature of the ambient to the pipeline at the second site station or that representative of the topography of the segment, computing the effect of the measured ambient temperatures at the first and second site stations on the sections intermediate the first and second site stations, computing the change in temperature of each section intermediate the first and second site stations due to conversion of kinetic energy into thermal energy and radiation and conduction of energy to or from the section, computing the change in volume of each section of pipeline wall and the change in volume of the liquid in each section based on the computed change in temperature of each section, determining the difference in measured volume between the volumes determined that have passed the first and second site stations for the defined period, correcting the difference in measured volume between the first and second site stations by adding or subtracting the change in the liquid and pipeline wall volume of all sections of the segment during the defined time period, comparing the corrected difference in measured volume between the first and second site stations with a threshold level, and generating an alarm signal if the difference exceeds the threshold level.

92 Claims, 17 Drawing Sheets

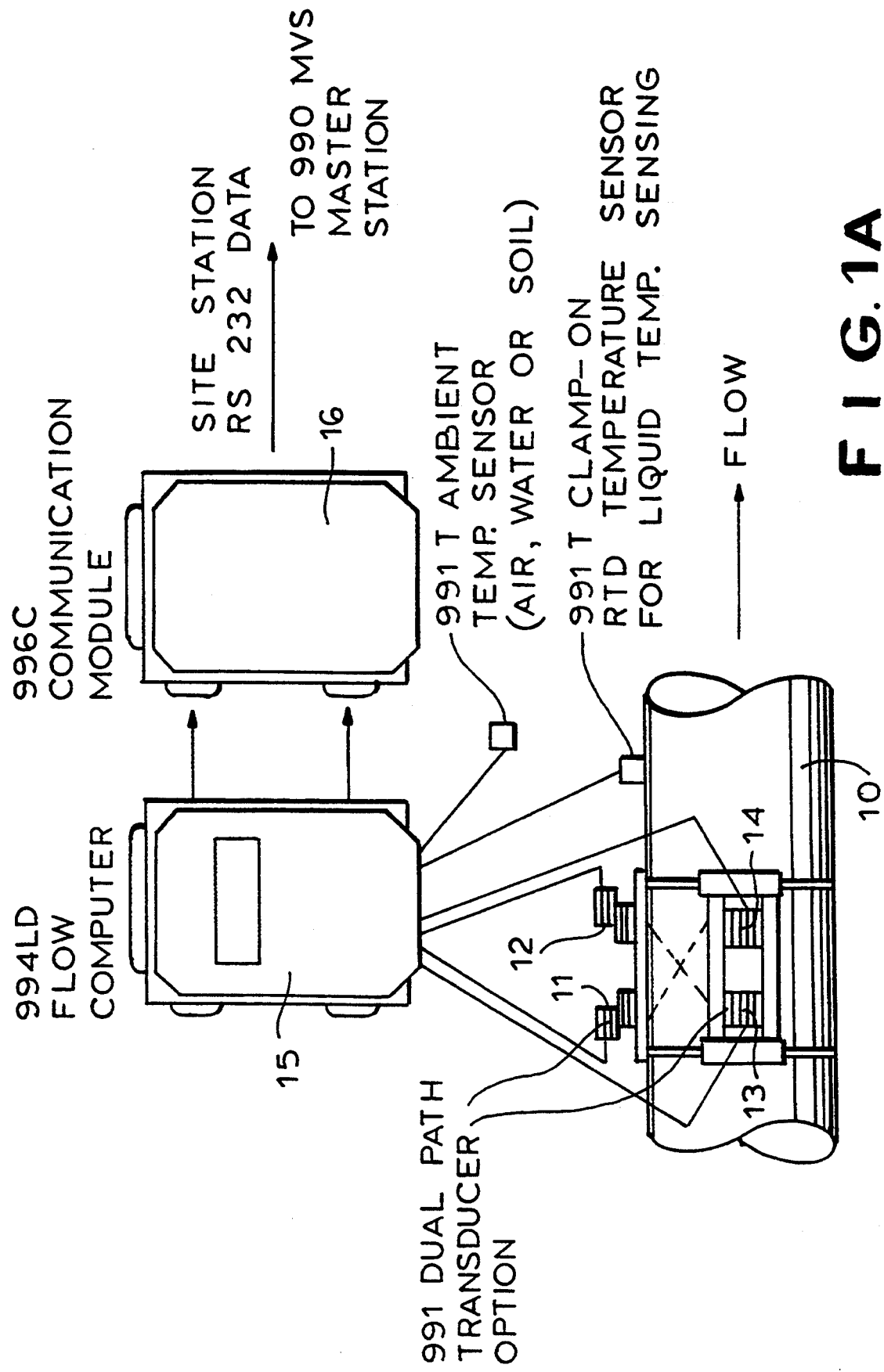

$$\cos a = \frac{d}{s} \quad ; \quad S = \frac{d}{\cos a}$$

$$VS = \frac{d}{\cos a \, T_L}$$

```
┌─────────────────────────┐
│ DETERMINE  AMPLITUDE    │
│ OF   RECEIVED   SONIC   │
│ SIGNAL                  │
└───────────┬─────────────┘
            │
┌───────────┴─────────────┐
│    USE  VARIATION       │
│    IN  SONIC            │
│    AMPLITUDE  AS        │
│    MEASURE  OF          │
│    AMOUNT  OF           │
│    FREE  GAS            │
└─────────────────────────┘
```

| | | 1 MIN. | 5 MIN. | 15 MIN. | 1 HOUR | |
|---|---|---|---|---|---|---|
| REPORT TIME | : 05.01.92 08.35 | | | | | |
| INT. PERIOD | : | 1 MIN. | 5 MIN. | 15 MIN. | 1 HOUR | |
| DELTA | : | 0.397 | 1.358 | 5.399 | 26.411 | BBL |
| THRESHOLD | : | 3.000 | 7.500 | 12.000 | 36.000 | BBL |
| APPCON | : | 67 | 67 | 68 | 70 | % |
| APPCON DELTA | : | 0.266 | 0.905 | 3.652 | 18.459 | BBL |

```
APPCON       : AEPKMFIT
             : 99909357

AERATION     : 90      (2%)
EMPTY        : 90
PACK         : 90
MAKEUP (1MIN): 00
FAULTY MEMORY: 90
FLOW RATE    : 30      ( 0.10 F/S )
INTERFACE    : 50      (40   M/S )
THERMAL (52) : 70      ( 0.184 BBL/M)
```

FIG.12

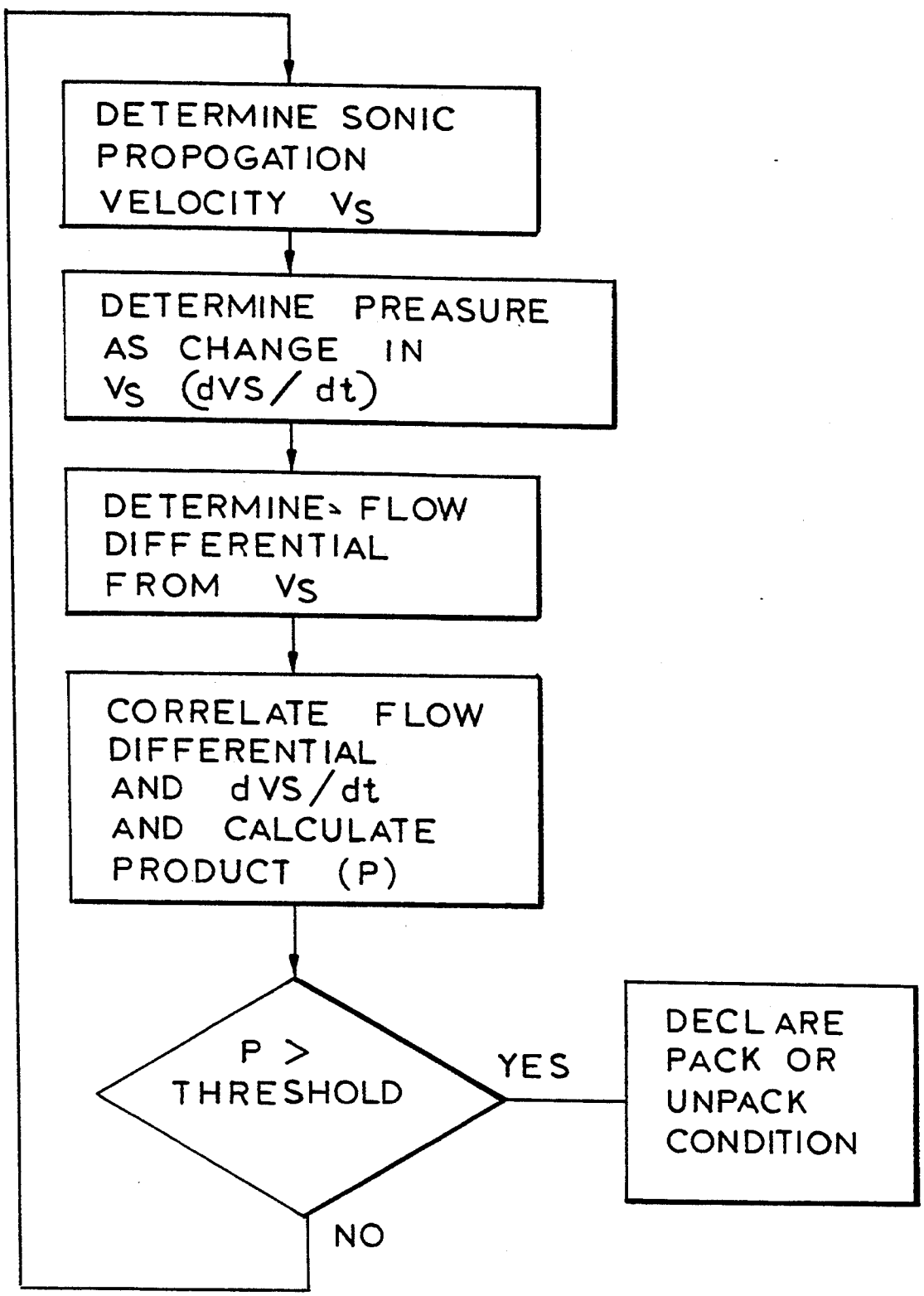
F I G. 13

METHOD AND APPARATUS FOR LEAK DETECTION AND PIPELINE TEMPERATURE MODELLING METHOD AND APPARATUS

BACKGROUND OF THE INVENTION

The present invention relates to a leak detection system for pipelines, and furthermore relates to a temperature modelling method and apparatus, particularly for use in a leak detection system for a pipeline.

The need for sensitive, reliable and affordable leak detection for petroleum and other fluid carrying pipelines is evident, based not only the economics of pipeline operation, but on the inevitable imposition of government regulatory requirements, for example, environmental regulations. Since hundreds of thousands of miles of pipelines are already in place, many with provision for periodic pigging or cleaning, the need for a non-intrusive leak detection system is also evident.

The detection of leaks in pipelines presents a number of technically challenging problems, together with a need to solve them. Not only is it necessary to preserve the value of the product in the line, but it is essential to detect product leaks for environmental considerations. A leak of product can seriously contaminate groundwater or the environment, and for some products, create the risk of fire or even explosion.

Compounding the difficulty of leak detection is the fact that pipelines often travel through difficult terrain, or under riverbeds where access is not possible. In addition, the lengths of line are great, requiring that each leak detection site station be sufficiently accurate to monitor large sections of the line, so as to avoid the need for an unaffordable number of monitoring points. In addition, the leak detection response rate must be extremely fast, even considering the long distances between site stations.

The method used must take into account a number of realities, which if not recognized, would lead to frequent false leak alarms, or the failure to recognize a true leak quickly. For example, the length of pipe between monitoring points will, in many cases, be many miles. Changes in temperature can cause the volume of liquid, and pipe, between these points to increase or decrease by a magnitude larger than the volume of leak which could be tolerated. In addition, operating conditions such as pressure variations, presence of free gas, slack line and line packing add further obstacles to accurate leak detection.

In addition, pipelines frequently sequentially transport many different products, often of unknown density and viscosity, especially at the interface between two liquids. The flowmeter itself must resist error as it measures these different liquids. To further complicate matters, temperature variation will, in addition, change these characteristics, even for the same liquid, at different locations on the pipeline. In response to these properties, and to the operating requirements of the pipeline, the flow rates may vary over a large range, frequently entering the transition region between turbulent and laminar flow. Detecting a leak under these circumstances is a difficult job.

It is also essential to recognize that the ultimate performance of the leak detection system depends directly on the operational accuracy of its flowmeter; not its "rated" accuracy based on laboratory tests under idealized conditions, but rather its ability to perform under the real and difficult conditions encountered in most pipeline applications, which frequently include the harshest of environmental conditions encountered on Earth, such as those which apply to the Alaska pipeline, or to operation in the deserts of Saudi Arabia.

As a practical matter, the flowmeters used for this service must also withstand the often corrosive or abrasive nature of the liquids themselves. They must be capable of long, maintenance-free service. Above all, their calibration must remain stable, and should not be prone to shift due to wear or to variable liquid properties. Since there are many pipelines which were in place prior to industry and public awareness of the environmental consequences of product leakage, it is important that the flowmeters install easily, and without altering the operation of the pipeline itself, such as in the passage of cleaning pigs, or introduction of performance affecting pressure drops.

As many pipelines are of long length, and require a considerable number of measurement points, the question of economy is of great concern. The cost of large size turbine and PD meters is high, without even considering the cost of installation and maintenance. And in lines which are pigged, the required pipe bypassing is an additional expense of some magnitude.

The heretofore known clamp-on transit-time ultrasonic flowmeters, e.g., those manufactured by Controlotron Corp. of Hauppage, N.Y., are ideally suited for adaptation in a leak detection system, possessing the accuracy, sensitivity, rangeability, speed of response, economy and reliability required of a practical leak detection system, in addition to being able to perform all functions non-intrusively. Furthermore, these devices possess the ability to identify the liquid itself, and obtain essential data on liquid density and viscosity.

The system according to the invention to be described preferably includes an important feature, the ability to compute the temperature at all points on the pipeline on an essentially continuous basis, and account for the expansion or contraction of the liquid and the pipe, so as to correct the flow emerging from any segment of the pipeline for these factors. The system according to the invention thus detects excess flow produced during expansion of the liquid, without presenting a false leak alarm, and determines reduction of pipe volume, which might mask a true leak. It also identifies non-leak causes of flow deficiency due to liquid contraction or pipe expansion, which might otherwise cause a false leak alarm, with consequent loss of confidence in the system.

As will be shown below, the attributes of clamp-on transit-time ultrasonic flowmeters make them particularly adaptable to resolve each of the limitations and requirements discussed above. The system according to the invention using such flowmeters offers a means of practical, effective and affordable pipeline leak detection.

SUMMARY OF THE INVENTION

It is an object of the present invention to provide a leak detection method and apparatus for pipelines.

It is a further object of the present invention to compensate such a leak detection system for temperature variations along the length of the pipeline, so that changes in flow rate or product volume caused by temperature changes do not result in false leak alarms, or mask actual leaks.

It is yet still a further object of the present invention to provide a leak detection system which utilizes non-invasive, clamp-on transit time flowmeters to provide a flow monitoring function necessary to proper leak detection.

It is yet still another object of the invention to provide a system for determining or modelling the temperature at any point along the pipeline, and thus compensate the system for temperature effects affecting flow rate and thus provide the ability to detect leaks accurately.

It is another object of the invention to provide a temperature modelling system for a pipeline which is particularly useful in a leak detection system for a pipeline.

It is another object of the present invention to provide a temperature modelling system for a pipeline in which the pipeline is divided into a plurality of segments, with each segment being divided into a plurality of sections of known volume, with the temperature change of each section being computed by modelling to determine the change in liquid volume and pipe volume of each section, and thereby determine same for each segment.

It is an object of the present invention to provide a method and apparatus for determining the change in volume of the exit liquid of each pipeline segment due to pipe and liquid expansion and contraction.

It is yet still a further object of the invention to provide a method and apparatus for detecting leaks in a pipeline which utilizes a plurality of integration periods of different time durations in order to be able to detect large leaks quickly and smaller leaks over a longer period of time, but still quickly.

It is another object of the invention to compensate for aeration and/or water in the liquid in a pipeline.

It is yet still another object of the invention to determine the presence of a liquid interface between liquids of different types in a pipeline.

It is yet still a further object to determine the beginning and end of product batches in a pipeline.

It is yet still another object of the present invention to provide a leak detection system which has self optimizing capability such that the calculated pipeline segment exit temperature may be compared with measured temperatures in order to optimize equations defining the system.

The above and other objects of the invention are achieved by an apparatus for detecting a leak in an elongated fluid conducting pipe, the apparatus comprising at least first and second flowmeter means for measuring an amount of fluid per unit time flowing within the pipe; the first and second flowmeter means coupled to the pipe at axially spaced locations with the second flowmeter means being downstream of the first flowmeter means; measurement means for determining a total amount of fluid flowing through the pipe at each of the locations for equivalent periods of time; comparison means coupled to the measurement means for comparing the total flow amounts at the first and second locations for the equivalent periods of time and for producing a volume difference value; and output means operable in response to a predetermined volume difference value from the comparison means.

The objects of the invention are also achieved by a method of leak detection for a pipeline, comprising the steps of dividing the pipeline into a plurality of segments, a first site station provided at the beginning of each segment and a second site station provided at the end of each segment, dividing each segment of the pipeline into a plurality of hypothetical pipeline sections, each section having the same nominal volume, measuring the liquid flow into the first section and determining a volume of liquid that has passed the first site station for a defined period, measuring the temperature of the liquid entering the first section at the first site station, measuring the liquid flow out of the last pipeline section of the segment and determining a volume of liquid that has passed the second site station for the defined period, measuring the temperature of the liquid leaving the last section at the second site station, measuring the temperature of the ambient to the pipeline at the first site station or that representative of the topography of the segment; measuring the temperature of the ambient to the pipeline at the second site station or that representative of the topography of the segment; computing the effect of the measured ambient temperatures at the first and second site stations on the sections intermediate the first and second site stations, computing the change in temperature of each section intermediate the first and second site stations due to conversion of kinetic energy into thermal energy and radiation and conduction of energy to or from the section, computing the change in volume of each section of pipeline wall and the change in volume of the liquid in each section based on the computed change in temperature of each section, determining the difference in measured volume between the volumes determined that have passed the first and second site stations for the defined period, correcting the difference in measured volume between the first and second site stations by adding or subtracting the change in the liquid and pipeline wall volume of all sections of the segment during the defined time period, comparing the corrected difference in measured volume between the first and second site stations with a threshold level, and generating an alarm signal if the difference exceeds said threshold level.

The objects of the invention are furthermore achieved by a leak detection apparatus for a pipeline, comprising means dividing the pipeline into a plurality of segments, said dividing means comprising a first site station provided at the beginning of each segment and a second site station provided at the end of each segment, each segment of the pipeline being divided into a plurality of hypothetical pipeline sections, each section having the same nominal volume, means for measuring the liquid flow into the first section and for determining a volume of liquid that has passed the first site station for a defined period, means for measuring the temperature of the liquid entering the first section at the first site station, means for measuring the liquid flow out of the last pipeline section of the segment and for determining a volume of liquid that has passed the second site station for the defined period, means for measuring the temperature of the liquid leaving the last section at the second site station or that representative of the topography of the segment; means for measuring the temperature of the ambient to the pipeline at the first site station or that representative of the topography of the segment; means for measuring the temperature of the ambient to the pipeline at the second site station, means for computing the effect of the measured ambient temperatures at the first and second site stations on each of the sections intermediate the first and second site stations, means for computing the change in temperature of each section intermediate the first and second site stations due to conversion of kinetic energy into thermal energy and radiation and conduction of energy to or from the section, means for computing the change in volume of each section of pipeline wall and the change in volume of the liquid in each section based on the computed change in temperature of each section, means for determining the difference in measured volume between the volumes determined that have passed the first and second site stations for the defined period, means for correcting the difference in measured volume between the first and second site stations by adding or subtracting the change in the liquid and pipeline wall volume of all sections of the segment during the defined time period, means for comparing the corrected difference in volume between the first and second site stations with a threshold level, and means for generating an alarm signal if the difference exceeds said threshold level.

The objects of the invention are also achieved by a method and apparatus for modelling the temperature at all sections of a pipeline. The method comprises dividing the pipeline into a plurality of segments, a first site station provided at the beginning of each segment and a second site station provided at the end of each segment, dividing each segment of the pipeline into a plurality of hypothetical pipeline sections, each section having the same nominal volume, measuring the temperature of the liquid entering the first section at the first site station, measuring the temperature of the liquid leaving the last section of the segment at the second site station, measuring the temperature of the ambient to the pipeline at the first site station, or that representative of the topography of the segment; measuring the temperature of the ambient to the pipeline at the second site station or that representative of the topography of the segment; computing the effect of the measured ambient temperatures at the first and second site stations on the sections intermediate the first and second site stations, and computing the change in temperature of each section intermediate the first and second site stations due to conversion of kinetic energy into thermal energy and the radiation and conduction of energy to or from the section.

Preferably, the temperature modelling method is used in a pipeline detection system, and further comprises measuring the liquid flow into the first section and determining a volume of liquid that has passed the first site station for a defined period, measuring the liquid flow out of the last pipeline section of the segment and determining a volume of liquid that has passed the second site station for the defined period, computing the change in volume of each section of pipeline wall and the change in volume of the liquid in each section based on the change in temperature of each section, determining the difference in measured volume between the volumes determined that have passed the first and second site stations for the defined period, correcting the difference in measured volume between the first and second site stations by adding or subtracting the change in the liquid and pipe volume of all sections of the segment during the defined time period, comparing the corrected difference in measured volume between the first and second site stations with a threshold level, and generating an alarm signal if the difference exceeds said threshold level.

The apparatus in accordance with the invention utilizing the temperature modelling method comprises means dividing the pipeline into a plurality of segments, the dividing means comprising a first site station provided at the beginning of each segment and a second site station provided at the end of each segment, each segment of the pipeline being divided into a plurality of hypothetical pipeline sections, each section having the same nominal volume, means for measuring the temperature of the liquid entering the first section at the first site station, means for measuring the temperature of the liquid leaving the last section of the segment at the second site station, means for measuring the temperature of the ambient to the pipeline at the first site station or that representative of the topography of the segment; means for measuring the temperature of the ambient to the pipeline at the second site station or that representative of the topography of the segment; means for computing the effect of the measured ambient temperatures at the first and second site stations on sections intermediate the first and second site stations, and means for computing the change in temperature of each section intermediate the first and second site stations due to conversion of kinetic energy into thermal energy and the radiation and conduction of energy to or from the section.

Preferably, the apparatus for modelling temperature is used in a pipeline leak detection system, and further comprises means for measuring the liquid flow into the first site station and for determining a volume of liquid that has passed the first site station for a defined period, means for measuring the liquid flow out of the last pipeline section of the segment and for determining a volume of liquid that has passed the second site station for the defined period, means for computing the change in volume of each section of pipeline wall and the change in volume of the liquid in each section based on the change in temperature of each section, means for determining the difference in measured volume between the volumes determined that have passed the first and second site stations for the defined period, means for correcting the difference in measured volume between the first and second site stations by adding or subtracting the change in the liquid and pipeline wall volume of all sections of the segment during the defined time period, and means for comparing the corrected difference in volume between the first and second site stations with a threshold level and for generating an alarm signal if the difference exceeds said threshold level.

In accordance with the method and apparatus, the invention utilizes clamp-on ultrasonic flowmeter for determining flow rate, and in particular, wide-beam ultrasonic flowmeters.

In accordance with a preferred embodiment of the invention, a plurality of spaced-apart site stations are provided on the pipeline. Each site station includes clamp-on ultrasonic flowmeters, a clamp-on temperature sensor and a flow computer. The flow computers from the site stations are coupled to a central master station via a suitable communications link. The master station preferably performs the computations necessary in order to determine if there is a leak and issues appropriate alarms if a leak is detected.

The requirements of the leak detection system according to the invention can be summarized to see the full implications they impose on the design of each pipeline site station. As described, each site station includes a flowmeter, means for temperature sensing, and a means of communicating data precisely and rapidly from the remote site station locations to a central location. At the central location, a master station computer can analyze data from adjacent site stations to assure against loss of liquid between these points. Thus, the leak detection system must:
1) Be of intrinsically high accuracy;
2) Maintain its accuracy under a wide range of liquid conditions;
3) Have high flow detection sensitivity, even at zero flow;
4) Have high flow rangeability, requiring little or no maintenance;
5) Be of high reliability, requiring little or no maintenance;
6) Install easily without altering pipeline operating conditions;
7) Be of low installed cost, as compared to turbine or PD meters;
8) Not be subject to wear, or change of calibration through use;
9) Have a fast response, to detect catastrophic leaks in seconds;
10) Be capable of monitoring large lengths of pipeline;
11) Be rugged relative to actual site environmental conditions;
12) Perform accurately in multi-product pipelines;
13) Be capable of detecting and compensating for free gas;
14) Detect empty pipe conditions instantly;
15) Not be affected by corrosive or abrasive liquids; and
16) Produce minimum to zero pressure drop.

In addition, the leak detector itself should be able to identify the type and/or significant properties of the liquid which is flowing, so as to identify its density at the current temperature, and aeration and/or water, if present, to compensate for the volume which may be occupied by free gas or water. Identifying the liquid is also important in order to determine the liquid viscosity, and the current Reynold's number, which affects the operation of all flowmeters to some degree, and sufficiently to affect the detection of small leaks if not corrected.

In addition, the leak detection system must have other unique attributes:
1) The flowmeter used must be compatible with the various liquids which will pass down the pipeline, and be able to measure each accurately regardless of its physical or chemical properties.
2) The flowmeter must not fail or have its life or reliability affected by nondescript liquid properties.
3) The flowmeter calibration should not be adversely affected by bends or elbows in the vicinity of the site station.
4) The flowmeter should be able to sense flow at very low flow velocities, since leaks can occur even when pumping is stopped.
5) The flowmeter should require only a minimum of operating power consistent with that available in remote locations.
6) The flowmeter should have the capability to communicate large amounts of data rapidly, in digital format, from remote locations.
7) The flowmeter should not depend on a "one shot" event, associated with the onset of a leak, which if not detected, precludes successful detection.
8) The flowmeter should not be adversely affected by changes in liquid pressure.

Other features and advantages of the present invention will become apparent from the following description of the invention which refers to the accompanying drawings.

BRIEF DESCRIPTION OF THE DRAWINGS

The invention will now be described in greater detail in the following detailed description, with reference to the drawings, in which:

FIG. 1A shows the detailed arrangement of a site station;

FIG. 12 shows a typical table display of relevant parameters by the display device and/or printer of the system according to the invention; and FIG. 13 shows how the system of the invention determines if a line packing or unpacking condition has occurred.

DETAILED DESCRIPTION OF THE INVENTION

INTRODUCTION

Figure 1:
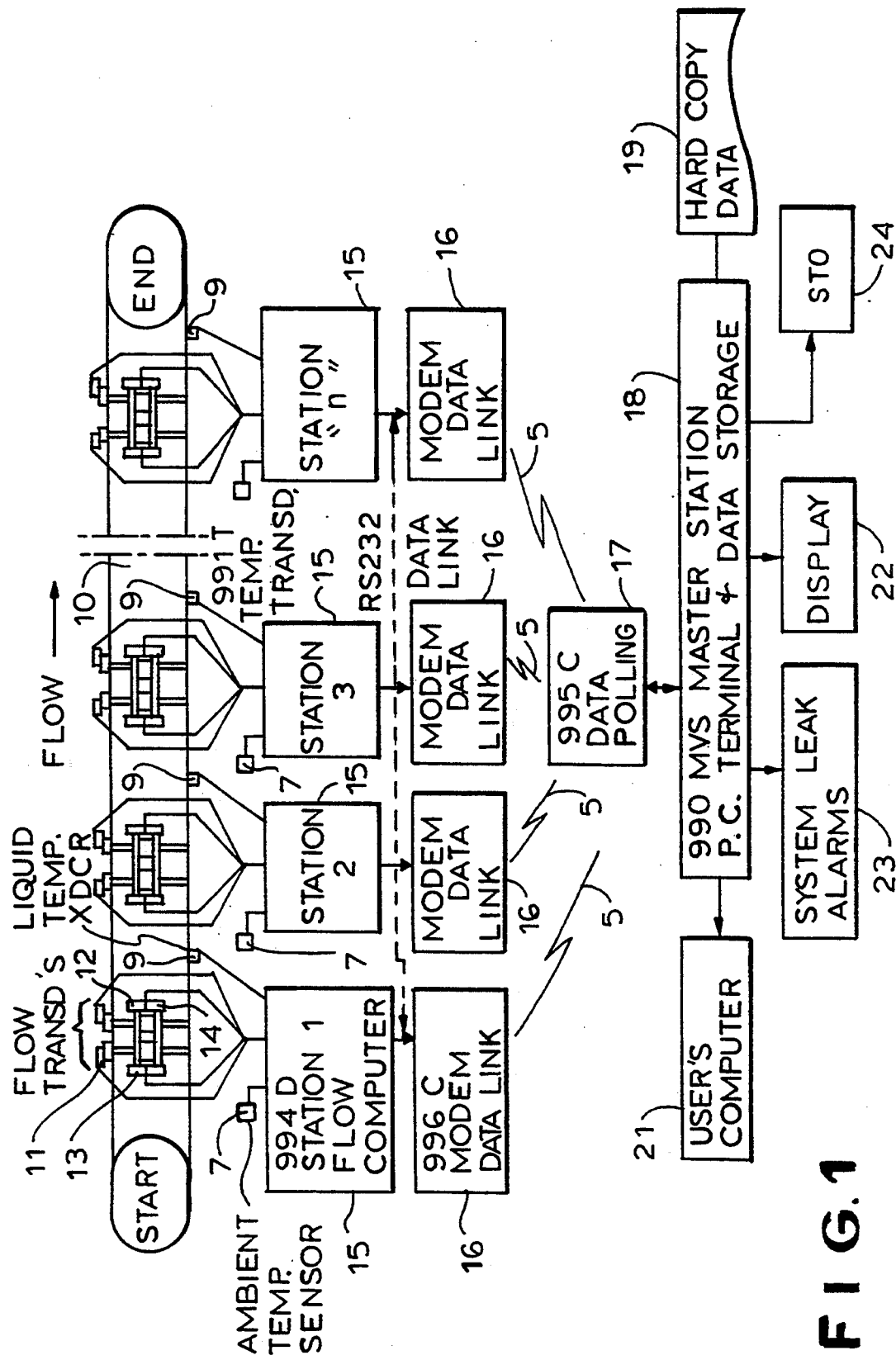
FIG. 1 shows a general block diagram of the leak detection system according to the present invention, wherein a plurality of site stations are shown.

As shown in FIG. 1, the system according to the invention includes a number of site stations, (as many as, or more than, 64, depending on the length of the pipeline), located at appropriate spaced points, and particularly at strategically important locations, such as at river crossings or at storage facilities, and one master station 18. FIG. 1 shows the first (station 1) and Nth (station N) site stations, as well as two intermediate stations (stations 2 and 3). The master station 18 permits the site stations to be assigned to one pipeline, or to as many pipelines as desired, with a minimum of two site stations per pipeline. FIG. 1 also shows the basic system communication link comprising data communication links 16 and 17, an optional interconnection to the user's main computer 21, and the master station facilities, such as display 22, leak alarm 23, optional storage facilities 24 and data printout facilities 19.

According to the invention, the communications links may be Controlotron type 996C data links and the master station, for example, a Controlotron type 990MVS. The flow computers 15 at each site station typically are Controlotron type 994LDN2SC. The entire site station may be a type 990LDSN2HSSC. Each of these devices is commercially available and need not be described in greater detail. The means, including software, present preferably in the master station 18 for detecting leaks and performing temperature modelling in accordance with the invention, will be described in greater detail later.

FIG. 1A shows the arrangement of a site station in greater detail.

With reference to FIGS. 1 and 1A, each site station 1 . . . N includes a flow computer 15, such as the Controlotron Model 994LDN2SC. This flow computer is connected to one or two pairs of Controlotron clamp-on transit time ultrasonic transducers, such as the transducers which are a part of the Controlotron 990LDPN2HS pipe package, and which transducers measure the transit time of ultrasonic energy in the liquid in the pipe to determine flow rate, and thus volume over a period of time, as known too those of skill in the art. See, e.g., commonly owned U.S. Pat. Nos. 3,987,674, 4,232,548 and 4,467,659. As shown, each pair of transducers 11, 14 and 12, 13 are mounted on the outside of the pipe 10, allowing for the determination of both upstream and downstream transit times, which are then used to calculate flow rate at that point in the pipe and volume of liquid that has flowed past the site station. The transducers, in transmit mode, transmit an ultrasonic signal into the pipe, and thus through the liquid. The signal is received by a second transducer operated in a receive mode. By measuring flow rate for a defined period of time, volume of liquid moving past that section of pipe can be calculated.

As shown in the above patents, alternatively, one set of transducers can be used with the transmitting transducer being electronically alternated from one side of the pipe to the other, in order to determine both upstream and downstream transit times. Also, alternatively, one set of transducers can be used, both arranged on one side of the pipe, the ultrasonic energy in this case being reflected off the opposite side of the pipe. FIGS. 1 and 1A show two pairs of transducers being used, known as the Dual Path transducer option in the Controlotron System 990 flow detection system. Because there are two paths rather than a single path if only two transducers are used, the system can provide greater accuracy in flow detection, and as to be described, in a leak detection system. This is because the use of two paths allows averaging and correlation effects not achievable with a single path system.

A clamp-on RTD temperature sensor 9 is also attached to the pipe for providing a signal to the flow computer 15 proportional to the temperature of the liquid. This may be a Controlotron type 991T temperature sensor. Another temperature sensor 7 is provided to measure ambient temperature, i.e., the temperature of the air, ground or surrounding water.

The master station polls each site station, which operates with an appropriate form of communication link 5, such as direct line, radio modem (shown), satellite communications, etc., sequentially, and obtains/computes a variety of digital data required for the accurate detection of a leak:

Identity of Site Station;
Exact time each site station was polled;
Total volumetric flow in last minute, i.e., average flow rate;
Total mass flow in last minute, if custody transfer is desired;
Identity of liquid at site station, if not alternatively identified by the master station;
Pipe/liquid temperature;
Ambient temperature of environment, e.g., air, soil for underground pipes, water temperature for submerged pipes;
Liquid sonic propagation velocity;
Liquid density, unless detected at master station;
Received signal strength;
Free gas numerical indicator;
Liquid viscosity, unless detected at master station;
Current Reynold's number, unless detected at master station; and
Status alarms comprising:
   Empty pipe;
   Reverse flow;
   Hi/Lo flow alarm;
   Site station integrity;
   Interface indicator;
   Pig detector; and
   Aeration alarm.

The master station computes the net effective difference in volume and interface, marked batch mass balance between any two adjacent site stations, after correcting for factors such as line packing, liquid and pipe expansion/contraction, the presence of same or different liquids at each site station, as would be the case in a multi-product pipeline. These differences in corrected volume balance preferably are computed for 1 minute, 5 minute, 15 minute and 1 hour rolling averages, so as to detect catastrophic leaks quickly (these should be detected in the 1 minute average), and slow leaks at the minimum flow rate possible (these should be detected in the 1 hour average, at the very least). In addition, leak detection thresholds are provided for each integration period. The computed data for each integration period are manually or automatically optimized for current and systemic pipeline conditions to minimize the possibility of false alarms.

Dependent on actual pipeline size and conditions, the performance listed in Table 1 below is typical of the system according to the invention, with improvement or deterioration dependent on the particular pipeline's operating condition:

TABLE 1

Estimated Percent of Flow Rate Detectable as a function of Integration Period

| System Type | % for Rolling Integration Period | | | |
| --- | --- | --- | --- | --- |
| | 1 Min | 5 Min | 15 Min | 1 Hr |
| High Precision- | 1.5 | 1 | 0.75 | 0.6 |

TABLE 1-continued

| | Estimated Percent of Flow Rate Detectable as a function of Integration Period | | | |
|---|---|---|---|---|
| | % for Rolling Integration Period | | | |
| System Type | 1 Min | 5 Min | 15 Min | 1 Hr |
| Dual Path Standard Precision- | 2 | 1.5 | 1 | 0.75 |
| Dual Path High Precision- | 3 | 2 | 1.5 | 1. |
| Single Path Standard Precision- | 5 | 3 | 2 | 1.5 |
| Single Path | | | | |

The invention is also capable, after optimization, of providing custody transfer accuracy in most pipeline applications.

In the above table, the definition "Dual path" means four transducers are provided (two paths) at each site station in contrast to a "Single Path" system which has only one path (two transducers at each site station).

The "High Precision" version refers to a system wherein the transducers are made to the exact dimensions of the pipe, in contrast to the standard precision wherein standard transducers are employed for a range of pipe sizes.

Automatic Liquid and Pipe Temperature Expansion/Contraction Correction-General Discussion As noted previously, it is important to correct the apparent measured flow volumetric flow rate, as measured by the site station, for any change in volume of either the pipe or the liquid, due to a temperature change of the liquid during any given integration period. These temperature changes are caused either by conversion of the kinetic energy of flow into thermal energy, or by the addition or loss of heat relative to the ambient temperature at any location within the pipeline segment. The ambient temperature may not be uniform at all sections of pipe within the segment, as may occur due to some sections being buried, and some being exposed to the atmosphere. In addition, some pipes are exposed to water as in river crossings, or to extremes of atmosphere, as when crossing mountains or deserts. The topography of the pipeline must be determined, so the effects of the particular ambient can be factored into the calculations. For example, if the pipeline is in soil, the prior temperature history of the pipeline is important on current and future ambient temperatures, because soil is affected by the pipeline temperature itself, which then affects the temperature of the pipeline. In contrast, because water and air are infinite sinks, the ambient temperature for water or air is not affected noticeably by the pipeline temperature, and thus does not have a noticeable effect in turn on the pipeline.

The master station contains parametrically controlled algorithms implemented preferably in computer programs, as will be detailed below, which compute the current temperature of all sections of the pipeline based on the thermodynamic equations for such thermal energy interchange. These computations are preferably done at the rate of the shortest integration period, generally, as described, at least once per minute, for all sections. Depending on the length of pipe between site stations, a pipeline segment, which is defined as the pipeline portion between adjacent site stations, may be divided into as few as 10, or as many as 100, fixed volume sections.

Figure 2:
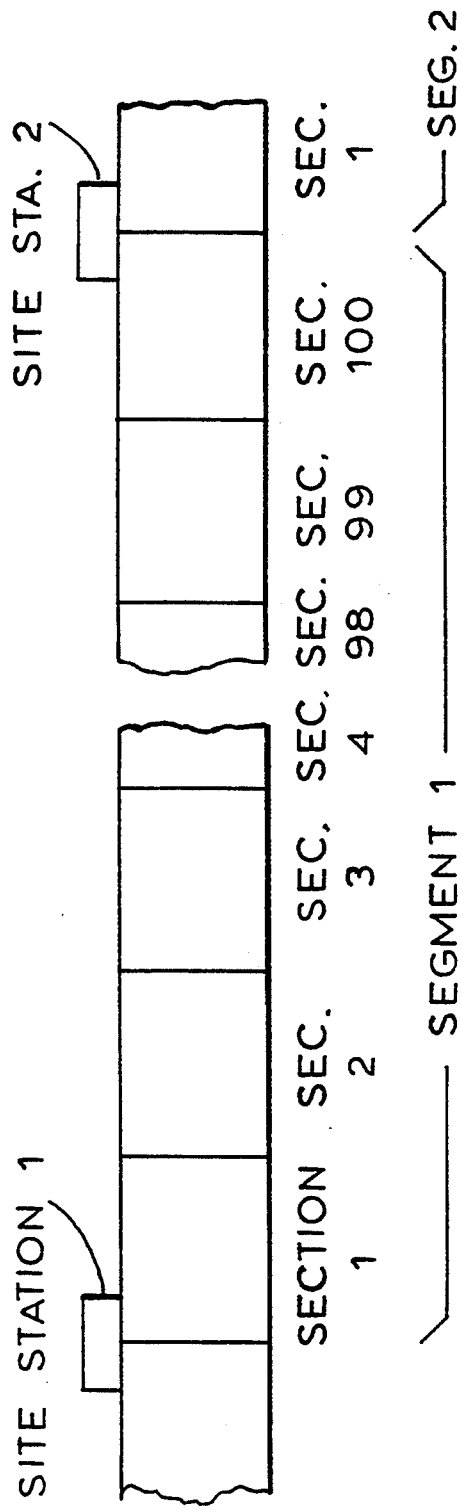
FIG. 2 shows an exemplary pipeline segment between two adjacent site stations, the segment being divided into 10 exemplary sections for purposes of illustration.

FIG. 2 shows one exemplary pipeline segment between adjacent site stations 1 and 2, with 100 sections illustratively being provided in the segment. More sections per segment could be provided, or fewer sections per segment may be used, depending on the pipeline size and requirements.

As will be apparent from the form of the algorithms shown below, once each minute, the temperature of each section is computed. In each computation, the addition of a flow rate determined volume from the prior section, the temperature rise due to heat generated by flow at the current flow rate, and the rise or fall in temperature due to conduction and radiation between the pipe and its ambient surrounding, are taken into account. Note that the first section of the pipeline segment receives liquid which is at a site station, site station 1. This permits its temperature to be measured directly (or assumed if already known), enabling the thermal equations to act on a known condition at the outset. In FIG. 2, a typical pipeline segment is divided into 100 sections per segment. Each segment may be, e.g., 20 miles long, with each section being 0.2 miles long.

The change in temperature of each section's volume of liquid is then computed for the unit integration period, e.g., one minute. This makes it possible to compute the effective expansion of the section's volume of liquid and pipe. It should be noted that in some sections, liquid may be expanding, while in others, liquid may be contracting. The master station computes the net change for each pipeline segment in accordance with thermodynamic equations to be described below. Since this volumetric change expresses itself at each adjacent site station at the velocity of sound, approximately 1350 meters per second for petroleum products, and assuming that most pipeline segments are around 20 miles long, the effect of this volume change will appear even at the shortest integration period for any particular segment. In any event, it will resolve itself completely within a 5 minute period, the next to shortest integration period, for all pipeline segments.

Once the master station computes the volume of liquid which enters and exits the segment of pipeline between adjacent site stations, from the measured flow rates, done at least once per minute, and fully compensated for any liquid or pipe expansion, the presence of free gas, and any other volume effect not strictly due to the entry and exit conditions, it computes the difference in actual volume between the two adjacent site stations (between entry and exit) during this period of time. It does this for all adjacent site stations on the pipeline.

This data is also entered into the higher order integration periods, which are FIFO rolling integration periods, preferably of 5, 15 and 60 minutes. See FIG. 3A. Each period has a user designated warning and alarm threshold, which is also subject to automatic modification dependent on pipeline conditions. When the accumulated difference within these respective periods reaches a warning level, or passes the alarm level, suitable notification to operating staff, and/or automatic controls are activated. In addition, the exact data is also displayed so that an observant operating staff may take early action to preclude either warning or leak alarm levels from being broached.

Figure 3A:
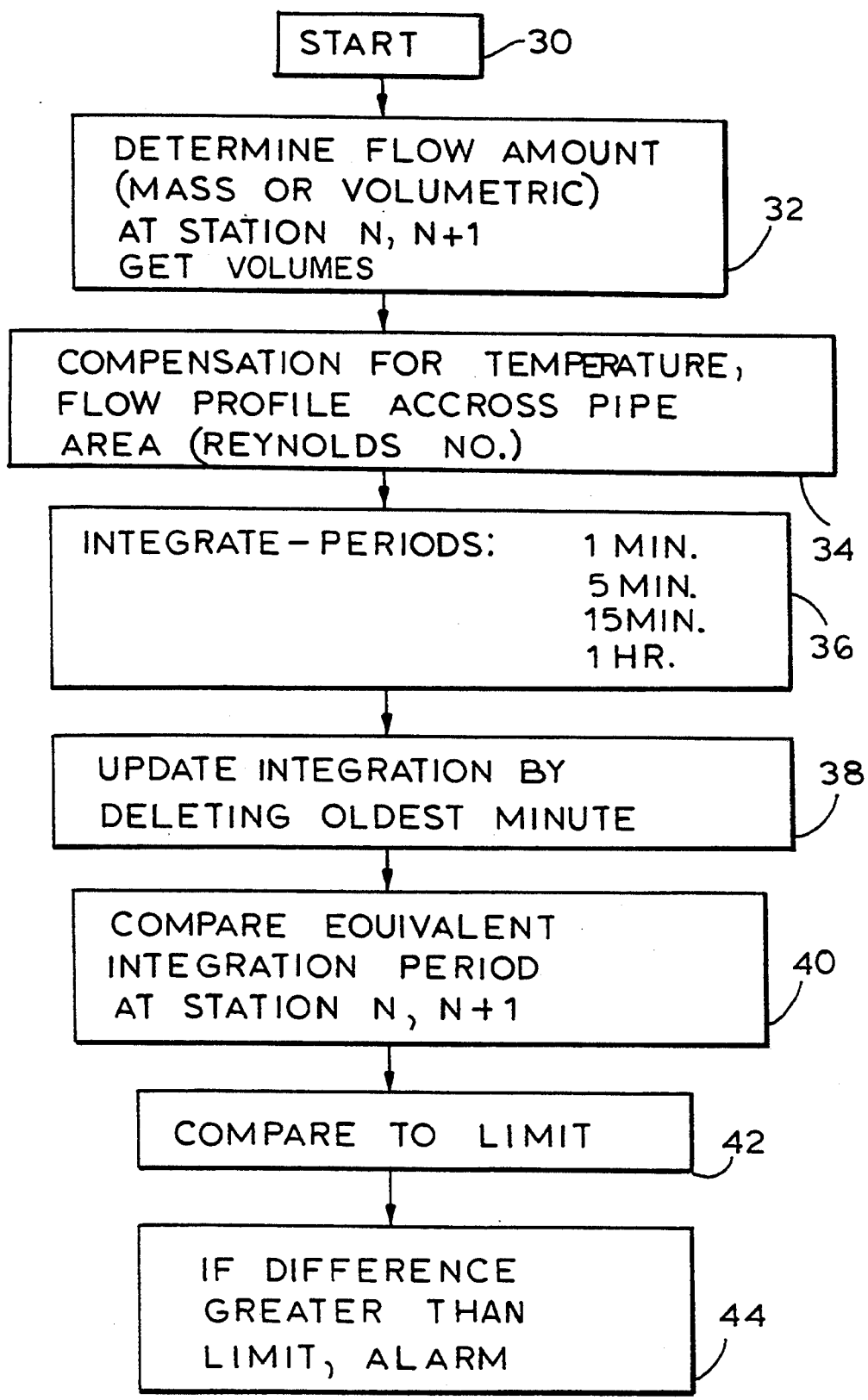
FIG. 3A is a flow chart of the computer program for leak detection implemented preferably at the master station.
Figure 3B:
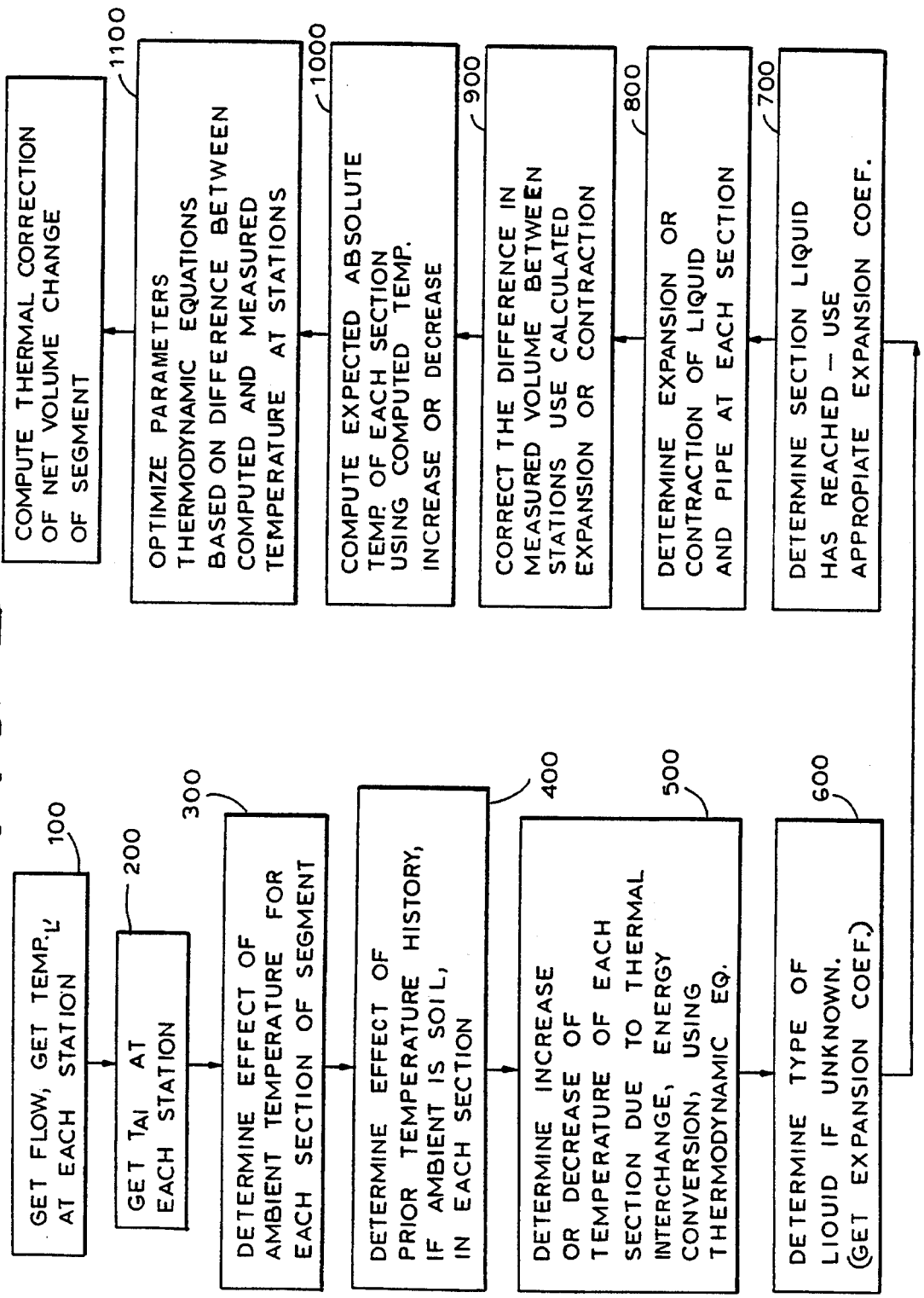
FIG. 3B is a flow chart of the temperature modelling and volume correction steps implemented by the invention.

FIG. 3B shows a flow chart of the temperature modelling performed by the invention to correct the measured volume for expansion and contraction of the liquid and pipeline due to temperature. Both the effect of ambient conditions as well as conversion of kinetic energy into thermal energy are taken into account.

FIG. 3A shows the general form of the flow chart of the program implemented at the master station.

Turning to FIG. 3A, the flow chart for the leak detection method and apparatus according to the invention is shown. After initialization (30), the flow amounts are determined at the two stations N and N+1 (32). The same would be done for stations N+2, N+3 .... The flow amounts can be mass flow or volumetric flow, e.g., in standard volume units. The flow amounts are then compensated for temperature and flow profile and optionally, pressure, (34), to be discussed in greater detail. The flow amounts are thereafter integrated for the four different periods of time at each station (36), one minute, five minutes, fifteen minutes and one hour. The integration periods are updated every minute by adding the newest minute and deleting the oldest minute (38). In this way, large leaks can be detected quickly, since they will show up in the small time integration periods, while smaller leaks will show up in the longer time periods, e.g., one hour integration periods. Data on the flow amounts preferably is collected in step 32 at a frequency greater than the smallest integration period, e.g., every 1/10 second.

Equivalent integration periods are then compared at stations N and N+1, and the difference found for each integration period (40). If the difference for any integration period exceeds a preset limit (42), an alarm is generated indicating a leak (44). The preset limits are determined in an optimization period during installation, when factors related to the pipeline system design are employed to arrive at the proper thresholds for the system.

The volume upon which the leak detection system according to the invention is based is not standard volume, but, rather actual volume. This is due to the fact that it does not matter if liquid leaking from the pipe is hot or not; it is merely necessary to know its actual volume. Standard volume would be of no value, since liquid which leaks from the pipe will change its volume in accordance with the actual pipe and ambient temperatures.

It should be noted that the computations not only predict the temperature at intermediate pipeline sections, but also predict the temperature at the exit of the pipeline segment at the end of the last section for that segment. Since this is at the exit site station, it is possible to compare the computed prediction of the exit temperature by the thermal equations to the actual temperature as measured at the exit site station. If it is noted that the computation is in error, either low or high, for each integration period, it is possible to associate this error with a difference between the assumed parameters of the thermal equations, and the correct parameters, so as to permit correction of these parameters to better reflect the actual conditions of that particular pipeline segment. This will be explained below in further detail.

Each pipeline has its own "personality". For example, one that runs under water will transfer heat to the environment at a greater rate than if the same section of pipe were, say, underground. These differences do not change the thermal equations. They merely change the parametric relationships, i.e., the relative parameters of the thermal relationships.

The master station thus permits a process called optimization, the act of updating the parameters of the thermal equations to reflect the actual pipeline conditions more accurately. In some cases it may even be required to modify the equations themselves in the event that it is learned that there is a pipeline condition which requires such an action.

It should be stressed that the only temperature measurement which can generally be made is at the site stations. Therefore, it is not usually possible to verify the computations, made by the master station, of temperatures at each intermediate section. However, if any of these were incorrectly computed, it would be impossible for the exit temperature of the pipeline segment to be correctly computed. Therefore, the process of optimization, resulting in an ever improving ability of the system according to the invention to predict the exit temperature correctly, as measured at the exit site station, permits the system to approach perfect correction of the expansion or contraction of the liquid and pipe, and to permit compensation of the flow rates for non-flow effects.

The master station also permits keyboard access to the remote site stations or to their effective data, so as to optimize their performance as the operating profile of the pipeline manifests itself. In addition, registration of new liquid data and tightening of thresholds is always possible to increase sensitivity of leak detection to the ultimate limit permitted by pipeline conditions. The master station, or auxiliary computers of the PC type, may be equipped to include a "playback" facility to enable the operating staff to see the effect which a pro-forma threshold algorithm or parametric upgrade would have had on prior operations, so as to optimize these settings for maximum sensitivity without excessive false alarm incidents.

It is possible to implement the necessary temperature computations only if the type of liquid entering the pipe segment is known timely and accurately. Liquids of various types and quantities pass each site station at somewhat unpredictable times. Knowing the exact moment when an interface passes, separating one type of liquid flowing down the pipeline from the next type, is not possible using conventional turbine and PD meters, since they do not have the capacity to distinguish between them. However, the transit-time ultrasonic flowmeter, of the type typified by the Controlotron System 990, has the ability to sense a variety of liquid properties essential for liquid type and property identification. See, in particular, applicant's copending application, Ser. No. 07/848,266, filed Mar. 9, 1992, which describes this technique for identifying fluids and their parameters. Without use of a flowmeter with these properties, leak detection of the type described herein is not possible.

Principle of Operation of Clamp-on Ultrasonic Flowmeter

As noted previously, the key to advancing leak detection performance above that now available for turbine and PD meter based systems is predicated on the intrinsic characteristics of state of the art clamp-on transit-time ultrasonic flowmeter technology.

Since there is much literature available on the principle of operation of the clamp-on transit-time ultrasonic flowmeter, this presentation is limited to a basic discussion. See, e.g., U.S. Pat. Nos. 3,987,674, 4,232,548 and 4,467,659, cited above.

The fundamental means of flow detection by a clamp-on ultrasonic flowmeter is to determine the effect of flow on the upstream versus downstream transit-time of a sonic beam injected and received by sonic transducers through the pipe wall, as the beam passes through the flowing liquid. The transit time is shortened in the downstream direction and lengthened in the upstream direction in proportion to the velocity of the stream itself. By solving the equation of such a system it is seen that:

$$Vf = Kdt/TL$$

where:
Vf=Flow velocity;
K=Calibration factor, in units of volume/unit time;
dt=Measured upstream minus downstream transit-time difference; and
TL=Measured average upstream and downstream transit-time.

Figure 4:
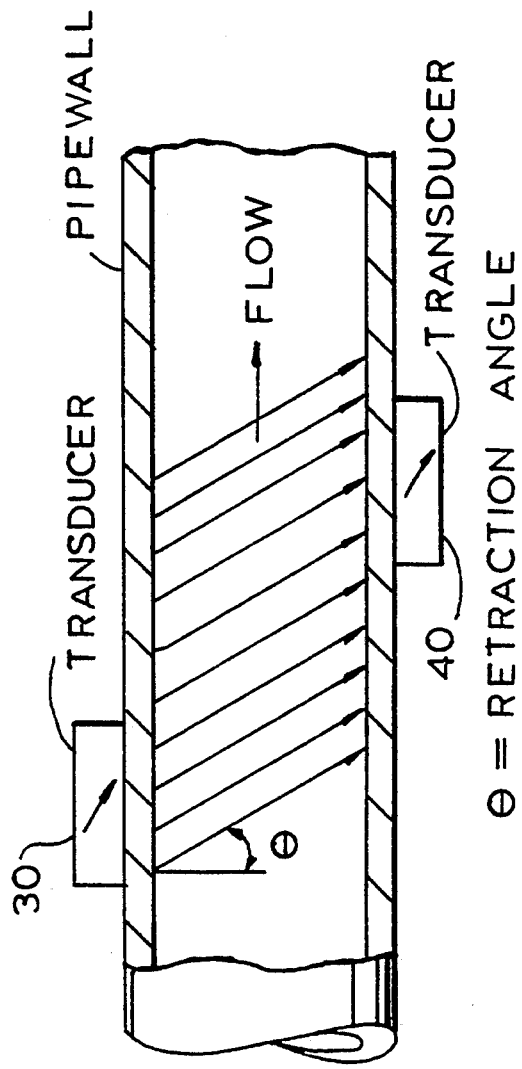
FIG. 4 is a schematic diagram illustrating the principles of wide beam sonic flow detection used in the invention.

In order to assure the desired degree of accuracy, it is essential to use "Wide Beam" clamp-on ultrasonic transducers, of the type described in commonly owned U.S. Pat. Nos. 4,987,674, 4,232,548 and 4,467,659. In this type, as shown in FIG. 4, a sonic beam is injected by a transducer 30 so that the beam travels axially down the pipewall. As it travels, it "rains" a wide beam of sonic energy on the opposite wall. Thus, even if the refraction angle of the beam changes with variation of the liquid sonic propagation velocity of the liquid, the sonic beam will always cover the receive transducer 40. This assures operation with all possible liquids, which cannot be achieved by "narrow" beam ultrasonic flowmeters.

Determining Liquid Identity and its Density and Viscosity

Figures 5, 5A:
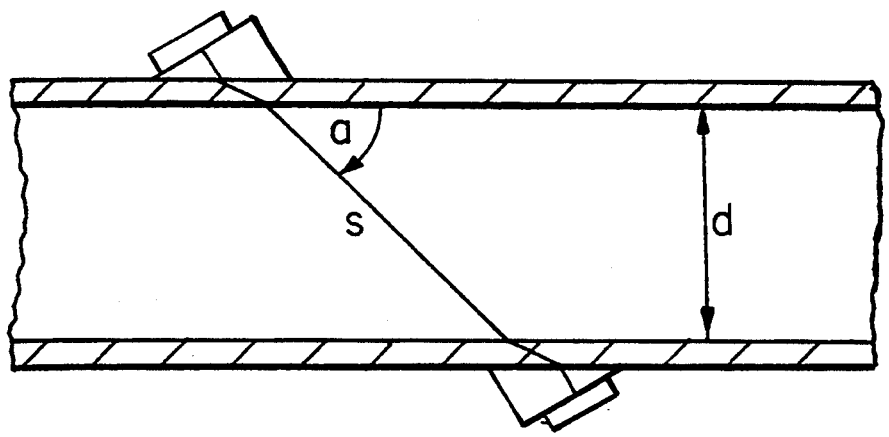
FIG. 5 is a schematic diagram illustrating the basic principles involved in determining sonic propagation velocity.
FIG. 5A shows how the amount of free gas in the liquid flowing in the pipeline is determined.

With reference to FIG. 5, which schematically shows the principles underlying flow detection using a clamp-on sonic flowmeter, because the system measures the transit time through the liquid, as well as the refraction angle "a", it computes the liquid sonic propagation velocity Vs as follows:

$$Vs = d/TL(\cos a),$$

d=Pipe inside diameter; and
a=Sonic beam refraction angle, computed by Snell's law.
See FIG. 5.

Figure 6:
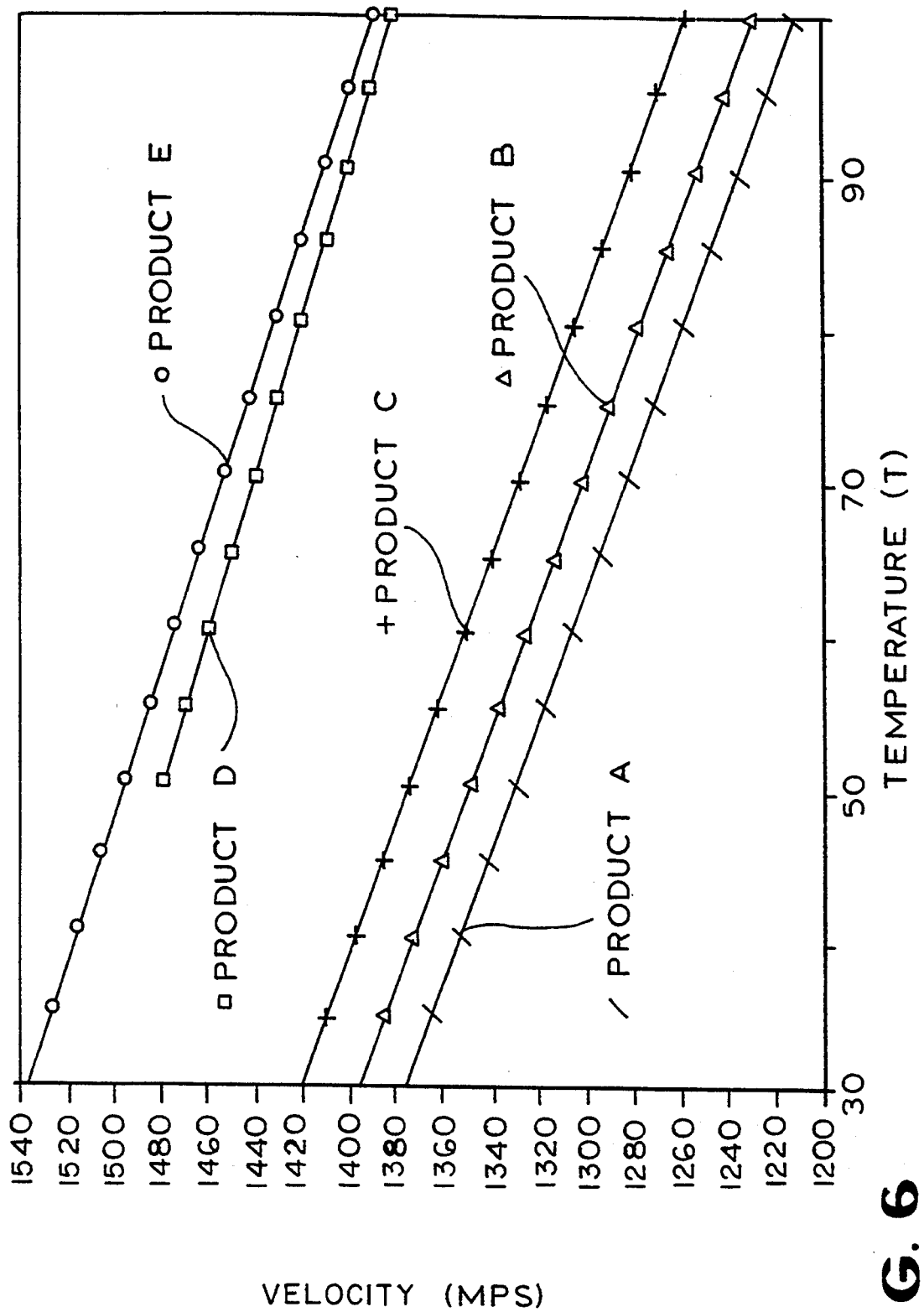
FIG. 6 shows a number of distinctive curves charting sonic propagation velocity against temperature for a number of different liquids.

Measuring sonic propagation velocity Vs is essential to proper leak detection. Each liquid which flows in the pipeline has a characteristic Vs versus temperature "signature", which permits the system according to the invention, which includes a clamp-on RTD temperature transducer, to identify the liquid type. This facility is illustrated in FIG. 6, which shows the Vs versus T signature for a number of different hydrocarbon liquids, and reveals how distinctly different they are from each other.

Figure 7:
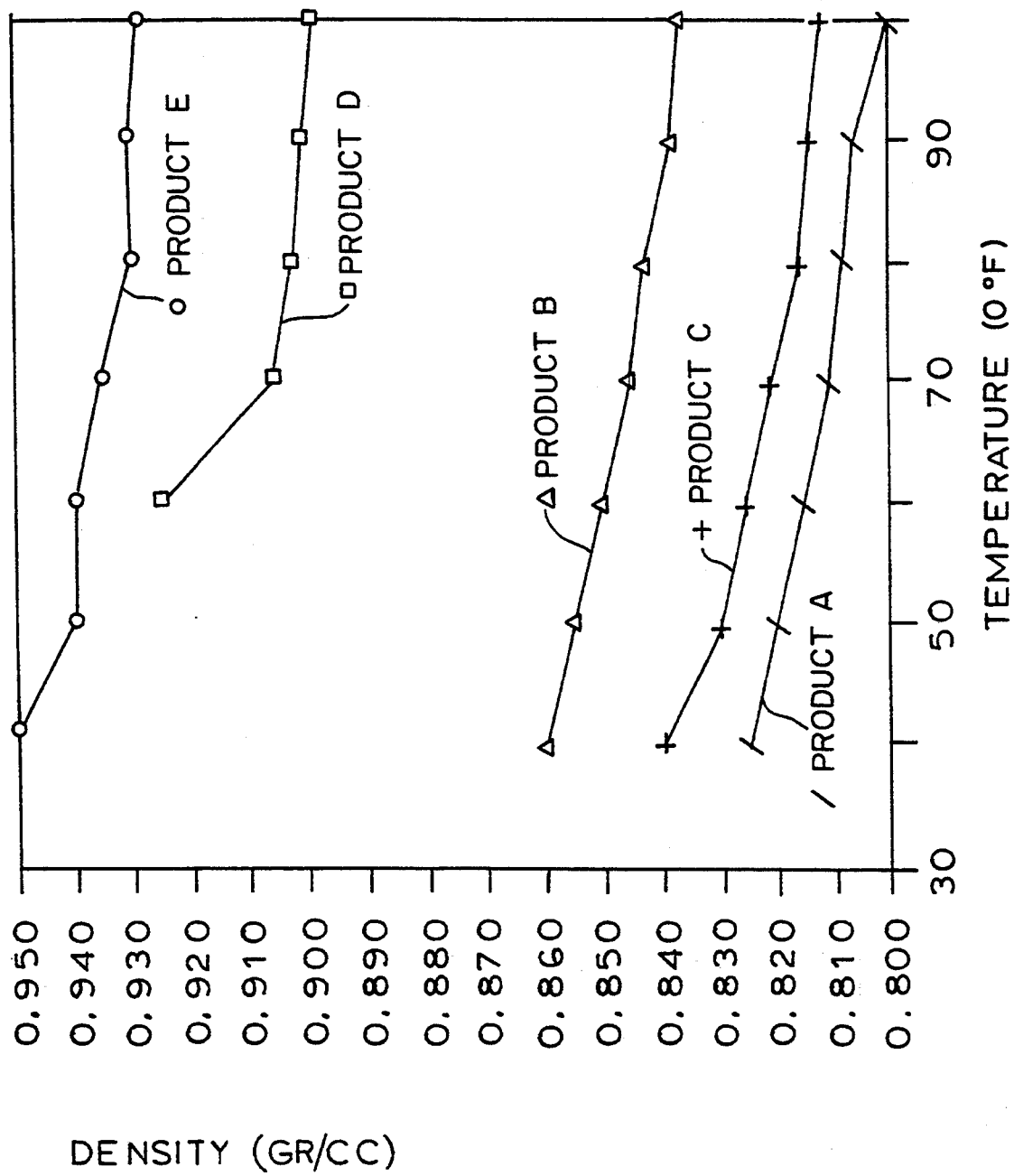
FIG. 7 shows the relationship between density and temperature for a number of different liquids.
Figure 8:
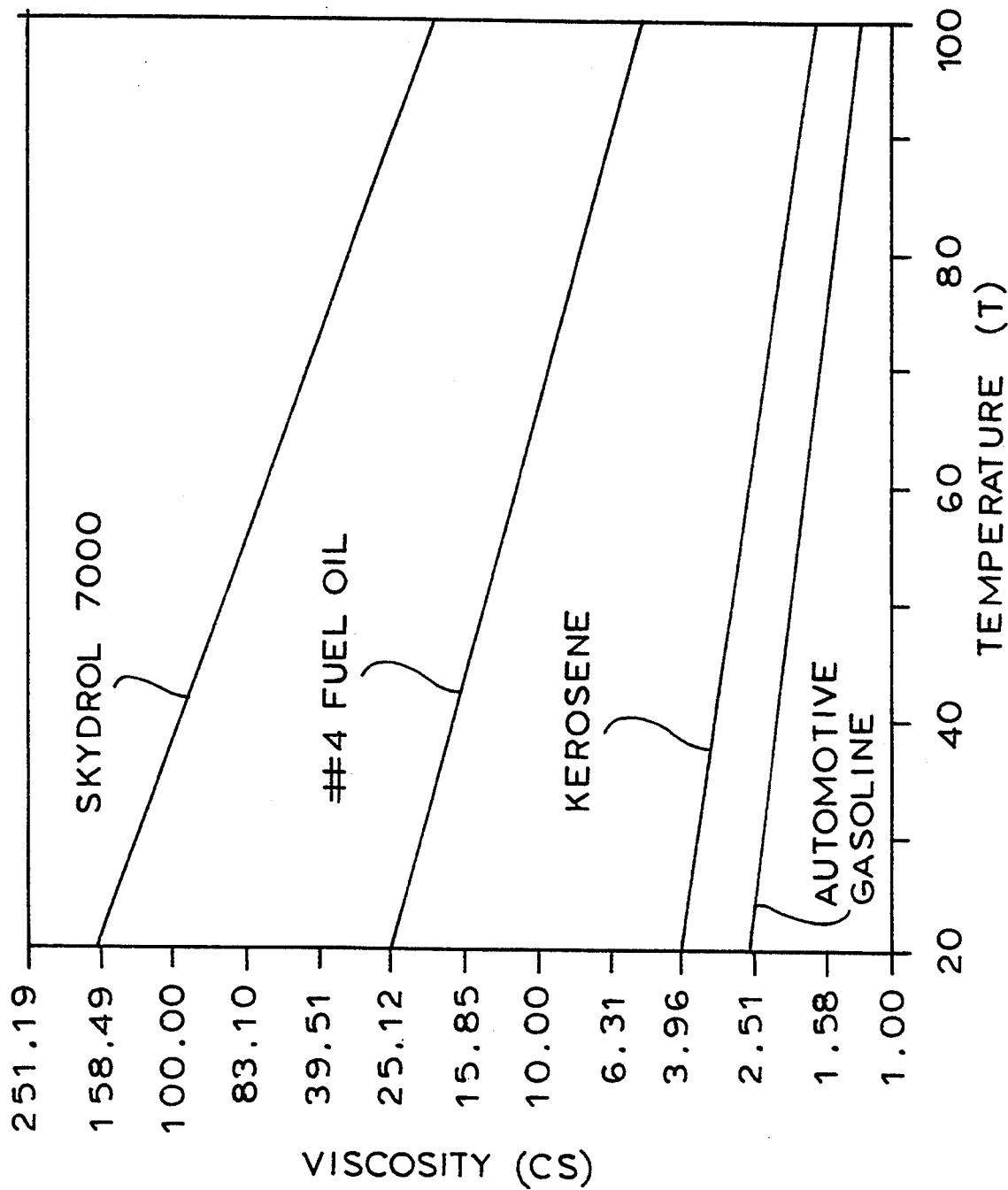
FIG. 8 shows the relationship between viscosity and temperature for a number of different liquids.

The system according to the invention then obtains the current density and viscosity data for the identified liquid from data held in an internal memory, as shown by the graphs of FIGS. 7 and 8. Once the liquid is identified, determining the density and viscosity can be performed by look-up tables, for example. This permits the system to correct for the difference in liquid type, which may be in adjacent site stations, and also obtain the correct expansion or contraction temperature coefficient of the liquid. In addition, knowing the current viscosity permits the system to compute the flow profile for extremely accurate flowmetering.

Even if the liquid cannot be identified, as may be the case if there is an unknown mixture in the pipeline, it is still possible to determine density and viscosity to a reasonable degree of accuracy. This is because there are several natural relationships which permit this. For example, there is a systematic relationship between sonic propagation velocity Vs and density, as expressed in the following relationship:

$$Vs = K(B/d)^{\frac{1}{2}},$$

where:
K=a constant for a given class of liquid;
B=liquid bulk compressibility; and
d=liquid density.

Figure 9:
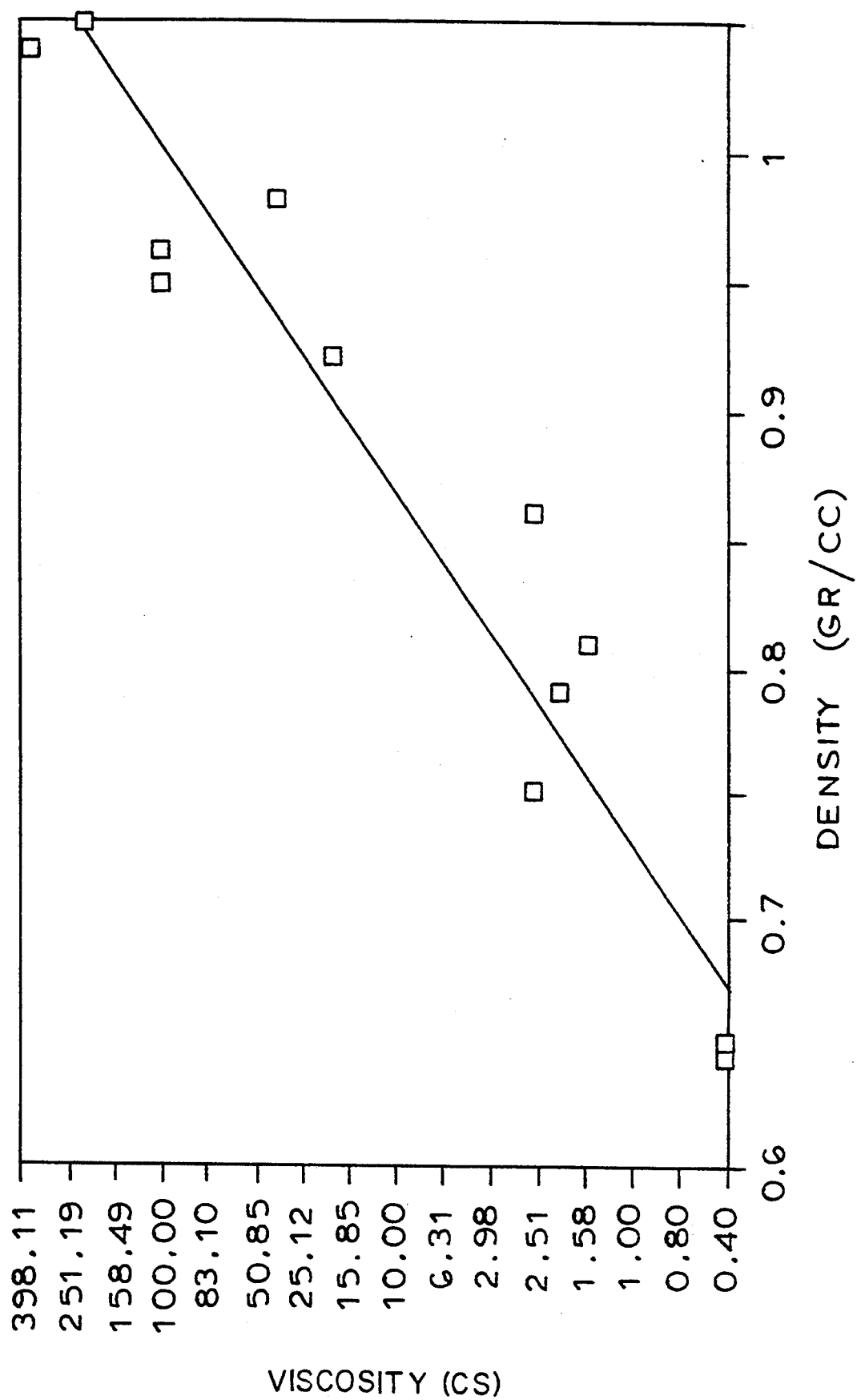
FIG. 9 shows the relationship of viscosity to density for typical hydrocarbon liquids.

In addition, the sonic beam which passes through the liquid is attenuated in proportion to the liquid's viscosity. The signal strength can be measured every 1/10 second, so there is constant monitoring of liquid viscosity. In addition, there is a natural relationship between viscosity and density, as illustrated in FIG. 9, which can be used to confirm the findings of the other parameters.

It should be noted that the system can be provided with external data inputs. Therefore, should the ultimate accuracy be desired for liquids known to be of extraordinary viscosity, it is possible to introduce the output of an in-line viscosimeter to eliminate any uncertainty in this regard.

Detecting Free Gas in Liquid

The system of the invention, in addition to monitoring signal strength, also monitors the variation in this parameter and in the sonic propagation velocity due to the scattering of the sonic beam caused by included free gas or liquid non-homogeneity. A numerical value of free gas in the form of a number between 1 and 100 is provided by the system which is related to the percentage of free gas. Knowledge of this parameter permits correcting the volumetric comparison of adjacent site station flow rates to assure accurate leak computation. This type of correction cannot be provided by conventional turbine or PD meters.

The leak detector according to the invention utilizes a 990 type flowmeter for the purpose of non-intrusive ultrasonic transit-time measurement of liquid flow rate. Such measurement is based on the transmission of sonic energy through the pipewall, and reception of the sonic signal after it has passed through the flowing liquid.

The amplitude of the received sonic signal is dependent on the viscosity of the liquid, and on the amount of nonhomogeneous scattering material which it may contain at any time. In general, materials which do not contain such nonhomogeneity display relatively constant amplitude as a function of time, changing only at a low rate due to slow changes in viscosity due to either temperature or chemical variation. The Controlotron 990 system flow rate detector contains a system of automatic level control, (ALC), which servo controls voltage applied to a gain controllable amplifier for the purpose of maintaining a constant amplifier output signal amplitude, needed to assure proper operation of a comparator used to detect the arrival time of the sonic signal. This is known to those of skill in the art. Thus, the variation in the ALC voltage needed to stabilize the amplitude of the amplifier output signal itself is a measure of the variation in the amplitude of the received sonic signal caused by liquid nonhomogeneity. This is shown in FIG. 5A.

The presence of nonhomogeneous material, particularly free gas bubbles, which are excellent scatterers of sonic energy, causes a rapid fluctuation of the ALC voltage. This variation is much more rapid than the variations caused by the slow changes in liquid temperature or chemistry, and is also much greater in amplitude under normal conditions. In addition, the number of successive commands to increase or decrease the amplifier gain by the amount needed to stabilize the amplifier output when stressed by a large time variant sonic signal amplitude, are greater in the presence of nonhomogeneity, since in the presence of homogeneous liquids the gain of the amplifier, being very near to that which produces a constant output amplitude, generally varies only by one or two counts of the digital to analog converter (DAC) which produces the ALC voltage itself in the System 990.

As will be apparent to one of skill in the art, an algorithm can be provided, based on the behavior of the ALC voltage to differentiate the presence of liquid nonhomogeneity from the homogeneous state. For example, using the peak to peak ALC voltage generating DAC as a source of data, it is possible to convert the peak to peak variation of this count value, the number of successive counts in the same direction, (i.e., the number of events requiring either successive gain increase or decrease), to a numeric value which is representative of the degree of nonhomogeneity. Since in many applications, the source of nonhomogeneity is known to be limited to aeration, as opposed to the presence of sonically scattering solids, this numeric indication can be referred to as an "Aeration" indicator.

Detecting Water in Oil

Figure 5B:
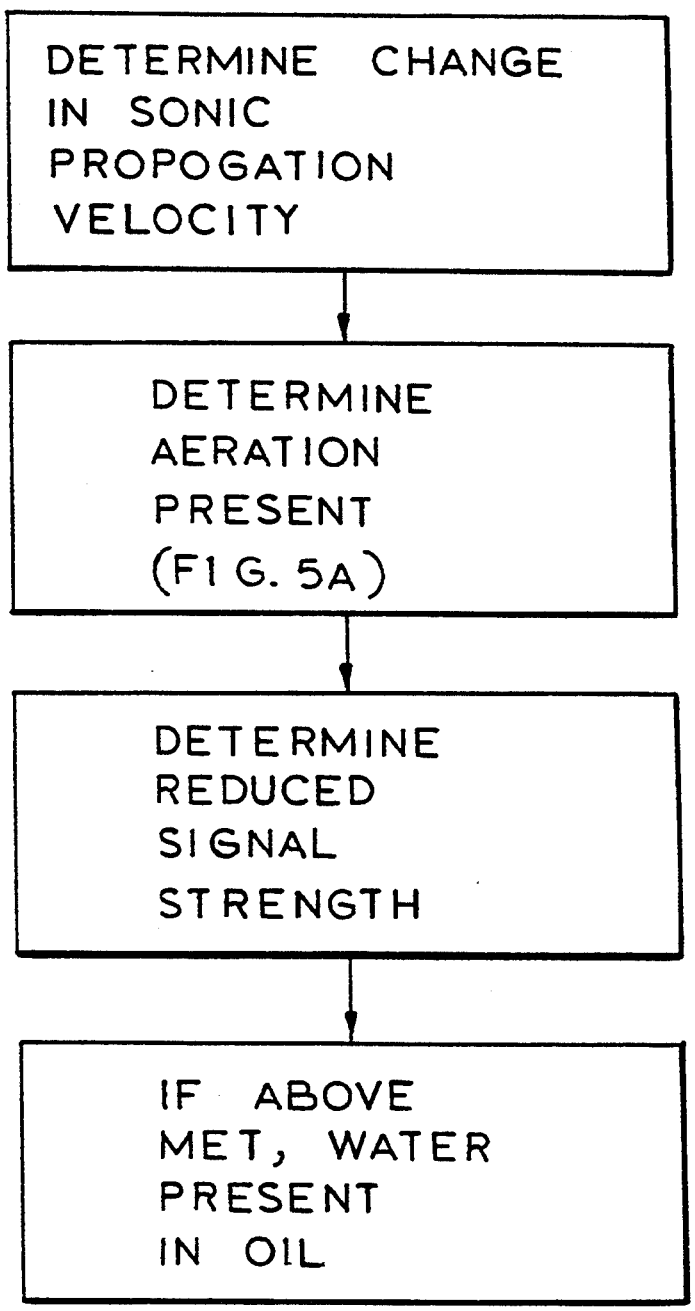
FIG. 5B shows how water in oil is determined by the system of the invention.

Under many circumstances water has a different sonic propagation velocity than oil. Therefore, the effect of water in oil is to change the sonic propagation velocity from that which should apply for that oil at any given temperature, as contained in the liquid data memory of the system of the invention. In addition, it also causes beam scattering, so that the combination of changed sonic propagation velocity, aeration indication and reduced signal strength indication will confirm the presence of water. When the pipeline is not flowing, judicious location of the site station may permit detection of the separated water content itself. This method of detecting water in oil is shown in FIG. 5B. Where all three conditions are met, it is likely that water is present in the oil.

Detecting Pressure Variations

Should it be desired to detect the pressure wave which may be created by a catastrophic rupture, the liquid sonic propagation velocity Vs, which is related to the current absolute pressure of the liquid, can be used. The relationship is approximately a 2% change per 1000 PSI. Since Vs is measured to six significant figures, it will be possible to detect even small sudden changes in pressure by analysis of the behavior of Vs. A sudden change in Vs propagates at the speed of sound from the point of the rupture to each of the adjacent site stations and arrives at each at a time separated proportionally by the relative distance between the point of the leak and each site station. Thus comparing the relative arrival times of a consistent drop in Vs can serve to mark the exact location of the leak. This is shown in FIGS. 5C and 5D.

Figure 5C:
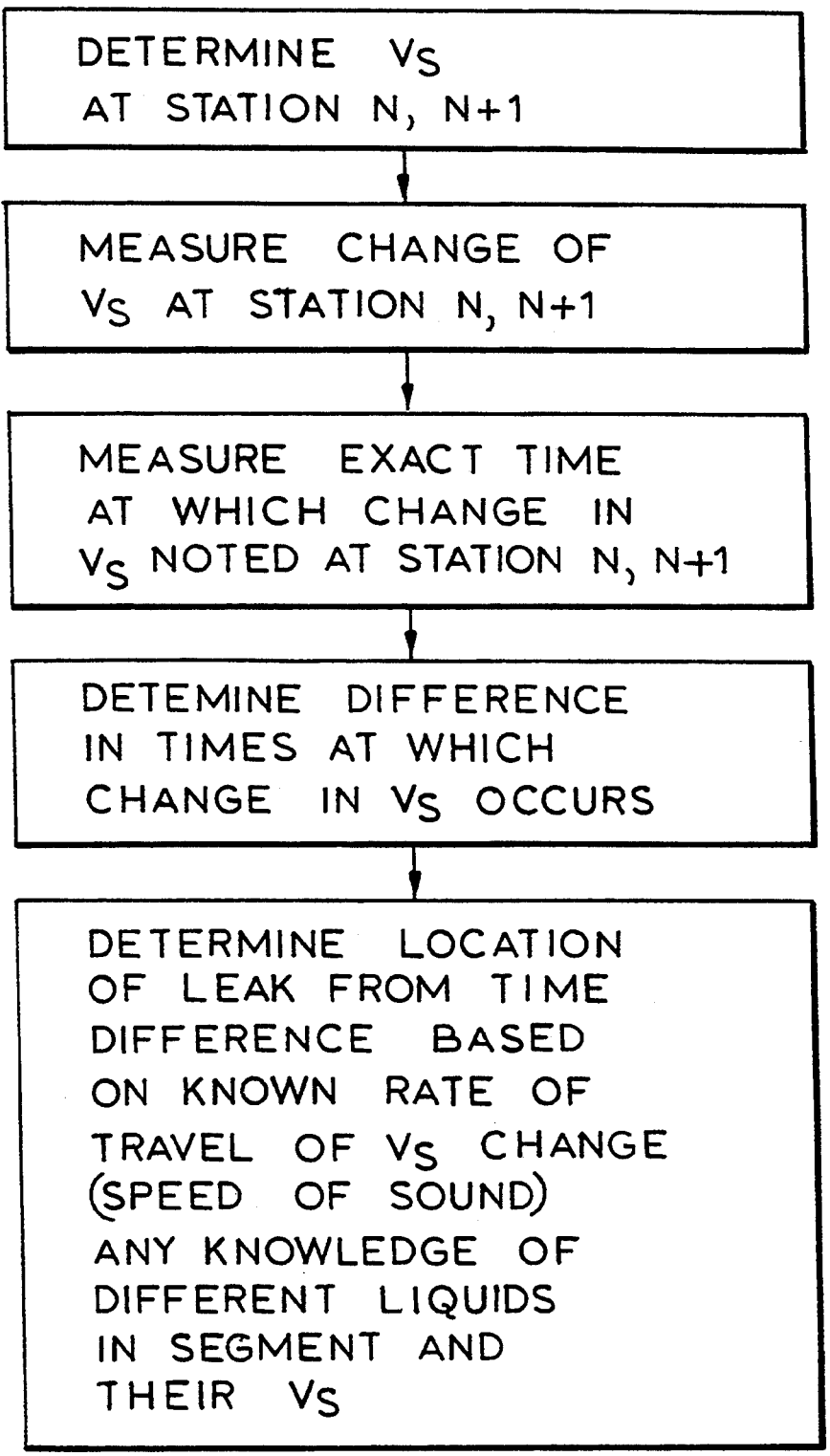
FIGS. 5C and 5D show how the site of a rupture may be determined.
Figure 5D:
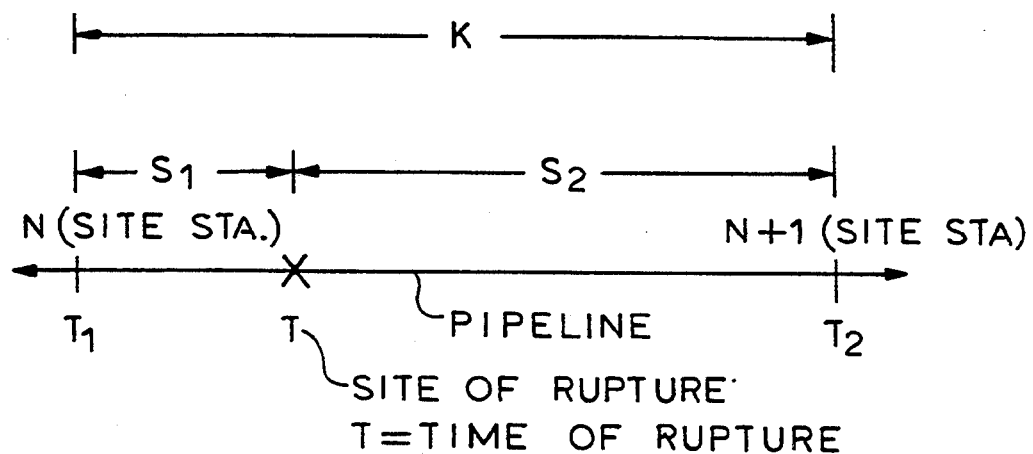

FIG. 5C shows the basic method for determining the site of a rupture. FIG. 5D shows how the site of the rupture can be determined mathematically. If a rupture occurs between site stations N and N+1, which are separated by a known distance K, it is a simple matter to determine the distances $S_1$ or $S_2$, which define the location of the leak. From the time t, at which the change in Vs is recorded t station N, we have $S_1 = V(t_1-t)$, where t is the unknown time of the leak and V=speed of sound. Similarly $S_2 = V(t_2-t)$. We know that $S_1+S_2=K$, and therefore, $S_2 = Vt_2 - Vt_1 + S_1$ or $S_2 = Vt_2 - Vt_1 + K - S_2$ so that $$S_2 = \frac{Vt_2 - Vt_1 + K}{2}.$$

Similarly, distance $S_1$ can also be calculated.

The determination of the location of the leak can also be made based on the ratios of the times of reception of the drops in sonic propagation velocity at each station, a triangulation technique.

Detecting Liquid Interface Passage

Figure 10:
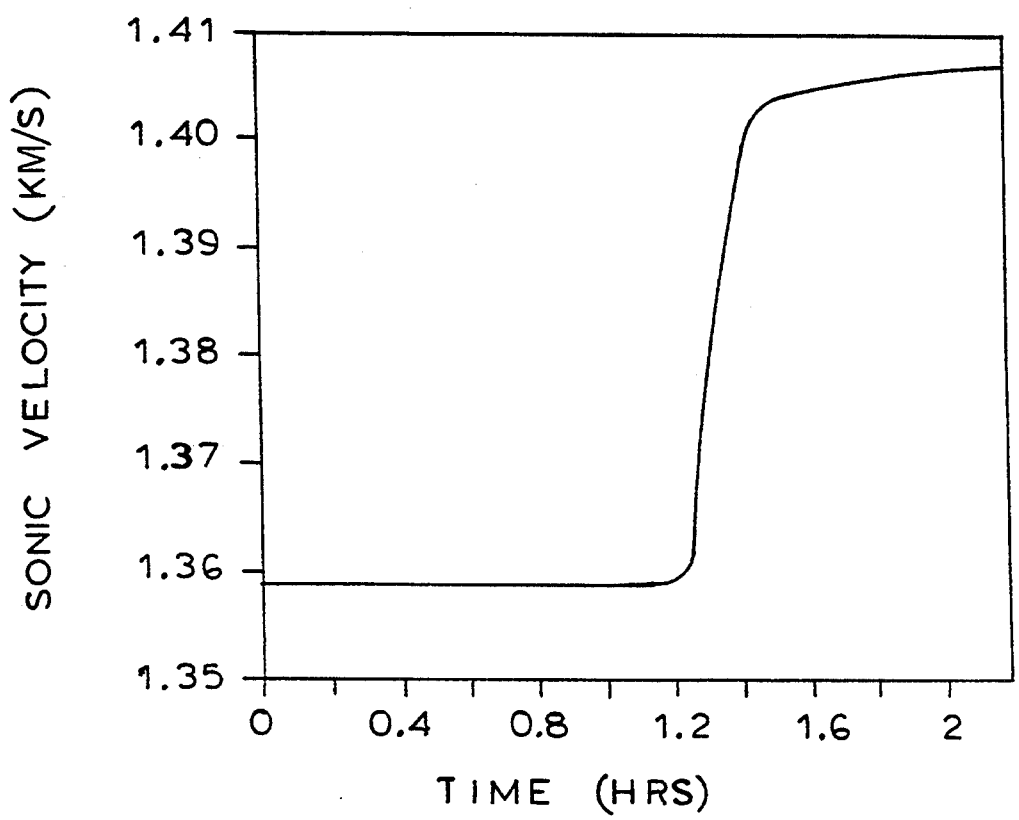
FIG. 10 shows how sonic propagation velocity changes at the interface between two liquids.

Since each liquid in the pipeline will have a distinct Vs/T signature, the system of the invention can detect the instant that the interface between liquids arrives at a given site station. An interface passage characteristic is shown in FIG. 10, typical for a refined product pipeline. As shown, it takes typically about 15 minutes for the interface to pass. The system of the invention marks the exact time of all such events, and the exact interval between the beginning and the end of the passage of a particular type of liquid past each site station. This is of great value, since it permits a check of the mass balance of each type, which may be used to confirm the effective optimization of the leak detection algorithms, and/or to permit accurate custody transfer of the designated liquid type. It also permits efficient discarding of the interface mixture, which must normally be excluded from storage of the unmixed liquid types.

As may be observed in FIG. 10, the mixture between liquids results in a Vs which depends on the mix ratio. These intermediate values can be used, together with the measured liquid temperature, to interpolate the density and viscosity of the mixture, for accurate flow measurement. In addition, this parameter may be used as a measure of the mix ratio itself in applications requiring the blending of two or more liquids.

Pig Detection

In many pipelines it is customary to pass a pig for the purpose of keeping the pipes clean. Conventional turbine and PD meters prevent passage of the pig, so that such pipelines require expensive bypass piping and/or the installation of manifolds to permit the use of non full-bore meters. In the case of the non-intrusive clamp-on transit-time flowmeter, full bore metering can be used, and of course, the clamp-on flowmeters do not interfere with pig passage.

There are occasions when a pig gets "lost", as pipelines are quite long. When a pig passes, the sonic beam is momentarily interrupted. The system of the invention will not confuse this condition with an empty pipe condition, as it can be programmed to look for the characteristic range of interrupt duration so as to identify it as a pig.

It is known that Petroleum pipelines are in need of periodic "pigging", i.e., the passage of a device down the pipeline to clear deposits laid down by the prior passage of various types of crude oil and refined petroleum products, from the walls of the pipe. These deposits otherwise serve to restrict the pipe diameter, or increase the amount of pumping pressure needed to maintain a desired flow velocity.

From time to time these pigs become "lost" within the pipe, due to hang-ups on pipe restrictions. Therefore it is of value to know when a pig has passed a known location, such as the location of the flow and temperature site stations. When a pig passes through the pipe at such a station it breaks the sonic beam, interrupting the signal. This is the same effect as would be caused by an empty pipe condition, and it is necessary to distinguish between the two conditions.

Figure 10A:
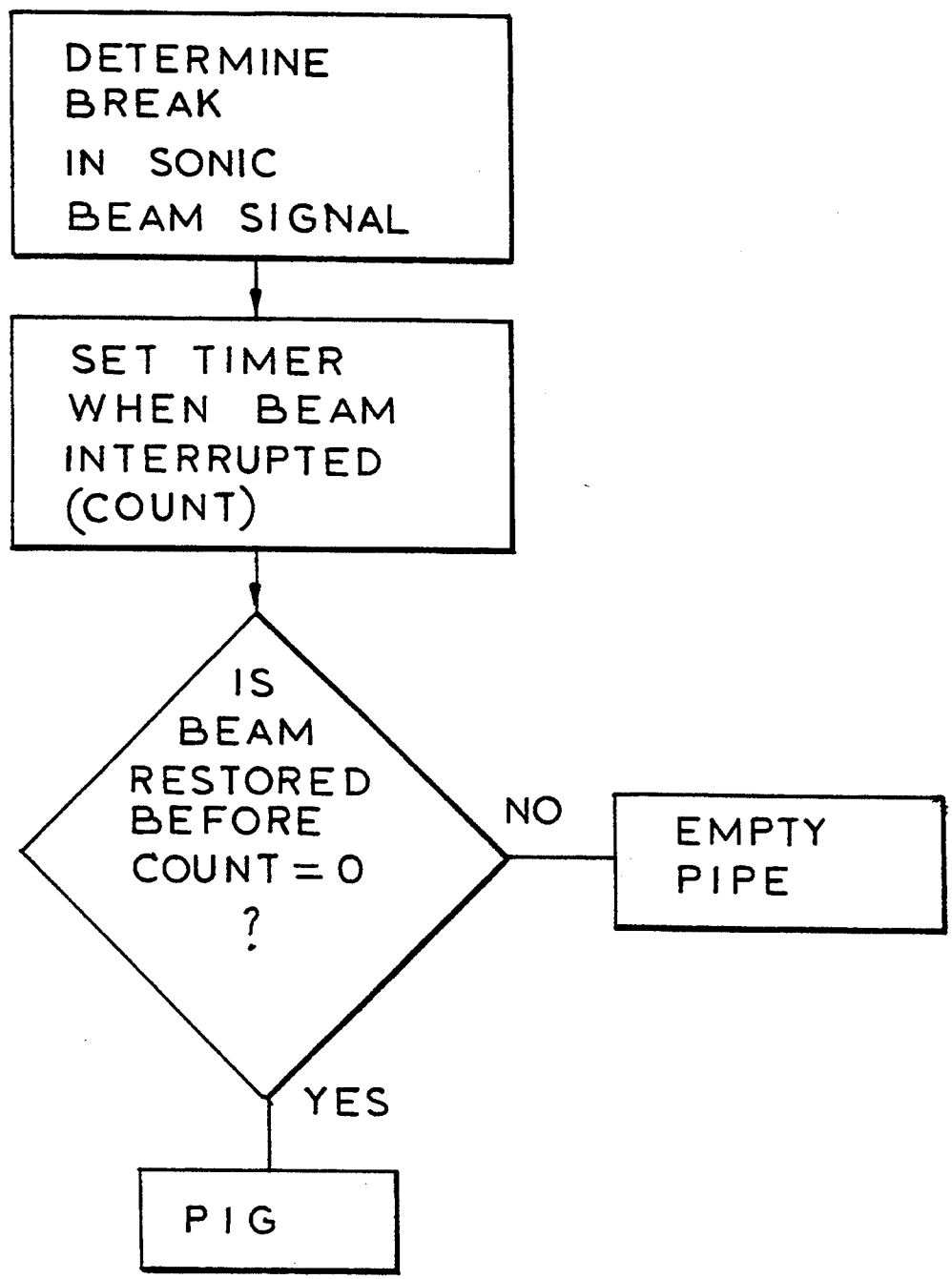
FIG. 10A shows how the passage of a pig is determined and distinguished from an empty pipe condition.

The invention distinguishes between an Empty condition and a pig by setting a timer when the beam is first interrupted. If the beam is restored within the set time period, which is selected to be just slightly longer than the time required for the pig to pass the Station at the last current value of the measured flow velocity, then the system identifies the interruption as being due to the passage of a Pig. This is easily distinguished from an empty pipe condition, which is usually much longer in duration, and in addition is followed by a period of slow sonic signal amplitude increase, as air or gas present during the empty condition is slowly expelled from the site station location. The method for determining a pig passage is shown in FIG. 10A.

Line Pack Detection

Since pipeline segments are usually quite long, in some cases over 25 miles, it is apparent that when a pump is turned on, and flow starts, it will take some time for liquid far from the pump to come up to the same velocity as liquid near the pump. During this period, the pump is compressing the liquid in the pipe, hence the term line pack as a descriptive appellation for this condition, during which the flow at the site station to which liquid is flowing is less than that at the sending site station. This deficiency has all the appearances of a leak, except that it is not, and therefore must be eliminated to prevent a confidence destroying false alarm, or contamination of the longer integration periods.

In view of the latter case, it is essential to detect the line pack condition, or unpack when flow is stopped, in real time. The system of the invention does this by recognizing that line pack can be detected by a correlation of the change in pressure of the liquid, in combination with the increase, or decrease, of flow rate. With reference to FIG. 13, since the change in flow rate is instantly manifested by its effect on the measured sonic propagation velocity of the liquid, it is possible to detect the pressure change without actually breaking into the pipe to detect the pressure or its change. It is known that an increase in pressure will always increase the liquid Vs, and a drop in pressure will always cause a decrease in Vs. Thus the system of the invention differentiates the reported Vs as a function of time. It then mathematically correlates this information with the differential of flow rate. When the product of the system declares a line pack or unpack condition, dependent on the sense of the Vs and flow change parameters.

This detection is simultaneous with the reported difference in flow rates between adjacent site stations. Its presence is used to "reject" the difference in flow from being reported in the data from which the one minute integration period alarms are derived. As such, it is then prevented from being entered into the 5, 15 and 60 minute integration periods. Therefore, no contamination of these periods' data results, and no subsequent corrective action is needed.

The existence of the line pack condition is displayed, as shown in FIG. 12.

Basic Operating Parameters of Transit-time Flowmeters

The following summarizes the site and master station parameters which are preferable for proper leak detection performance:

Flow range from 0 to +/−40 ft/sec flow velocity, bidirectional;

Flow sensitivity of 0.001 ft/second at any flow rate, even zero;

Calibration stability of 0.05 to 0.1 percent;

Accurate operation for Reynold's number from 1 to $10^8$;

Dual beam operation insensitive to distorted flow profiles due to limited pipeline straight run conditions;

10 Hz flow detection response rate;

Reliable clamp-on transducers do not contact liquid and can be installed and/or serviced without shutting down pipeline;

Clamp-on RTD temperature measurement for pipeline and liquid expansion/contraction detection;

80 ft/second$^2$ flow slew rate capability;

Senses liquid sonic properties, and with temperature, permits liquid identification for determination of viscosity and density;

Built-in datalogger with site identification and time stamp;

Incorporates 9600 Baud, min, RS-232 I/O Serial Data communication;

Built-in diagnostics alerts user to liquid/system conditions, such as empty pipe, aeration, reverse flow, and equipment state;

Flow computer rated from −40 to +155 Deg. F., and transducers up to 450 degrees F.;

Built-in ultrasonic interface detection;

Built-in pig detection;

Intrinsically safe.

System Equations

The system according to the invention performs its compensation for thermal expansion and contraction of the pipe and liquid between adjacent site stations in accordance with thermodynamic equations, typified by those presented below.

The thermal model includes equations to represent the gain or loss of temperature in each section of the pipeline segment by computing the effects of heat exchange of the current computed section temperature relative to the computed current local section ambient temperature, as well as the effect of conversion of liquid kinetic energy to thermal energy. This computation is done at a regular interval, typically once per minute. In the case where the local section topography is an underground installation, i.e., in soil, the ambient temperature of the soil is itself affected by the prior history of the temperature of liquid which has previously passed through the section, and heated or cooled the soil, changing its temperature from the ambient which would have been present without this thermal inertia, which is a property of soil, but not of either air or water, which are considered to be infinite heat sinks.

The thermodynamic equations which have been successful in computing the temperature of the liquid at the end of the segment at which liquid emerges are shown below. These equations are successful providing that the equation parameters are conditioned by the process of optimization to represent the actual thermal transfer properties of each pipeline. General Thermodynamic Equation:

$$dT/dt = Kf*Vf^3 + Kpa(TA-TL)$$

1) Kinetic to Thermal Conversion Equation where, $Kf = f(0.07716/(2*D*g))$ and,

Vf = Liquid velocity, in ft/sec f = Friction factor, (dimensionless)

D = Inside diameter of pipe, (feet)

g = Gravity constant, (32 ft/sec/sec) and dT = change in temperature of section in last minute due to thermal energy gain or loss dt = time interval between computations = 1 Minutes, (Typical)

2) Liquid to Ambient Temperature Coupling dT/dt(Ambient interchange) = Kpa(TA-TL) where, TA includes effect of thermal inertia, if Section is in soil Kpa = Thermal coupling coefficient, (Degrees F/Minute/(TA-TL)

TA = Ambient temperature, (Degrees F), for Air, Soil or Water

TL = Liquid temperature, (Degrees F)

The master station collects flow rate, temperature, aeration, sonic signature and other data accumulated at each of the site stations. The change in net segment liquid and pipe volume is then computed using the thermal expansion coefficients appropriate to the materials involved; the liquid properties of which are as determined through the aforementioned process of liquid type identification, and the accessing of data for each liquid type previously entered into the memory bank.

Then, typically once each minute, the difference in the corrected enter and exit volumes, for any particular pipeline segment, is computed. The net volumes, typically, for four different time integration periods, are computed. Each period has its own threshold limit for permitted volume accumulation before a warning or leak alarm is declared. Provision is made in the master station for display of this information, both graphically, with visible alarm threshold limits, or numerically. Also displayed are appropriate time stamps, and confidence factors, computed from the various observed conditions, such as aeration, empty pipe, Reynold's number etc., as applicable to the particular pipeline as determined during the process of optimization.

The system uses the reported liquid and ambient temperatures of each site station to compute the instantaneous temperature of all sections within each pipeline segment. It then computes the change in average liquid and pipe temperature which may have taken place since the last data report. Based on this information the system then computes the amount of liquid which will exit each pipeline segment due not to flow, but rather due to a change in thermal conditions within the segment. The master station then uses this information, together with the reported segment entry and exit flow rates, to compute the net non-thermally induced difference in volume which entered and left each pipeline segment during each period.

The computed difference in segment volume is entered into four different FIFO segment integration periods, typically 1, 5, 15 and 60 minutes. These periods each have segment "Warning" and "Alarm" volume thresholds designed, respectively, to detect catastrophic, medium, small and minuscule leaks. In short, each is designed to show the smallest leak in the shortest possible time.

Figure 11:
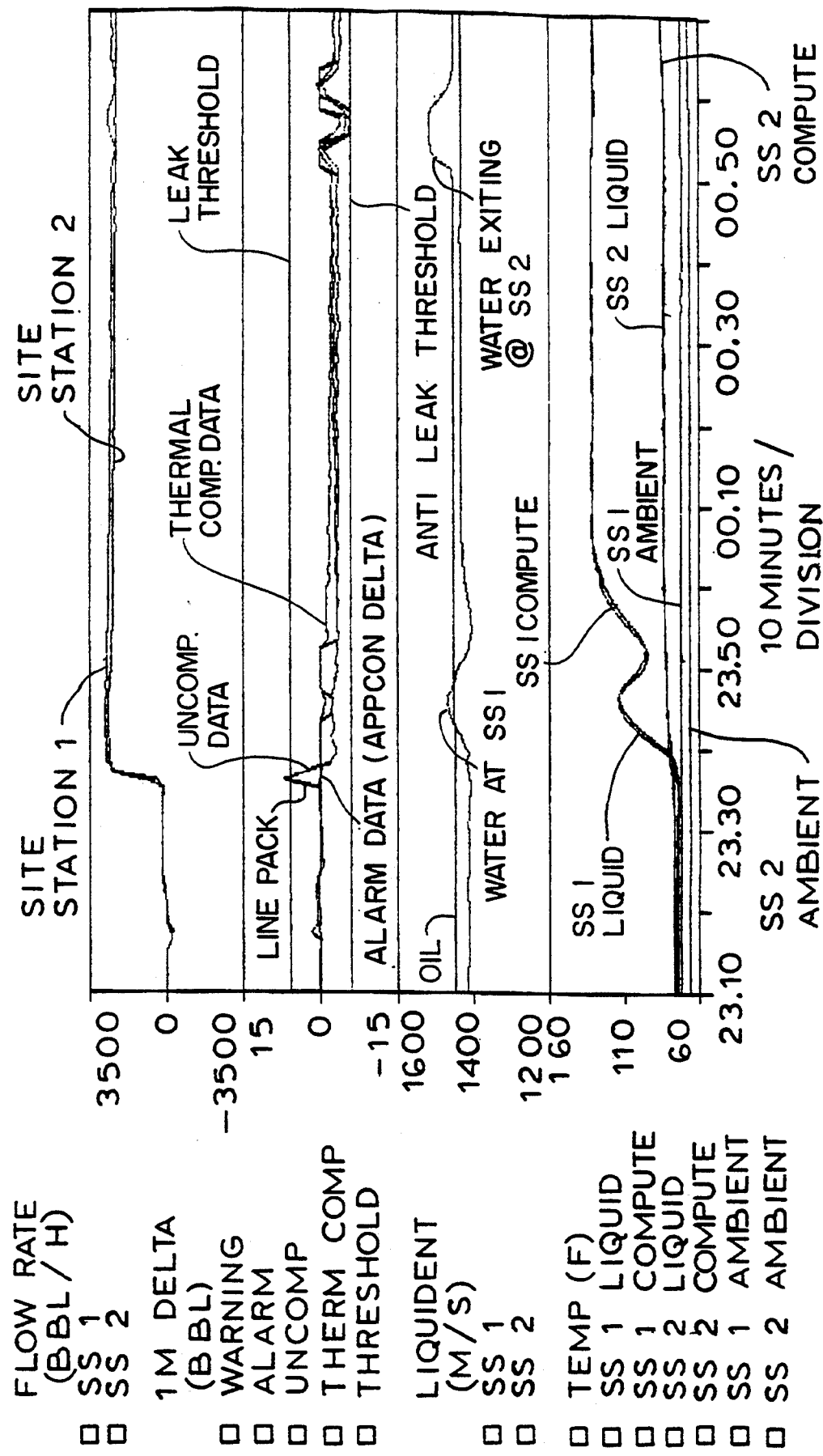
FIG. 11 shows a typical graphic display by a display device according to the invention showing a segment status listing, including integration periods, volume differences, threshold values, application condition factors as well as other relevant variables.

The resultant data is displayed on the master station screen in the form of either a graphic display, illustrated in FIG. 11, showing the flow rate at each site station, together with its current warning and alarm threshold settings, sonic propagation velocities and liquid and ambient temperatures, or as a table display, such as shown in FIG. 12, for each pipeline segment. On the table display, any segment whose data represents a warning or alarm level will be displayed in yellow and red respectively, together with an Application Condition (AppCon) factor, (to be described below in more detail) which is based on the conditions current at that segment. Thus the operator is able to act with confidence on the information provided.

The use of AppCon factor prevents false alarm since the existence of conditions such as excessive aeration, line slack or line packing should preclude premature staff reaction. However, the operator may then call up the complete diagnostic screen for that segment, and make an informed decision as to whether to declare a leak alarm. In short, the system never takes control of the pipeline operation out of the hands of operating personnel. It does make it possible for them to know instantly what the conditions are so that an informed human decision can be made. All such conditions, and the reactions of operating staff, are preferably logged in for future reference, however.

In FIG. 11, graph (a) shows the flow rate in bbl/hr for two site stations SS1 and SS2. Graph (b) shows the one minute period delta in bbls for both the uncompensated volume differences and thermally compensated volume differences as well as the + and − thresholds, here set at 3 bbls. If a warning or alarm is generated, it is indicated opposite the respective area marked "warning" or "alarm." This will be explained further below. As shown in graph (b), a line pack condition X is detected, but the system will not generate an alarm, because the AppCon delta, explained below, is 0, and is below the threshold.

Graph (c) shows the sonic propagation velocities of the liquid at each site station, and, as explained herein, thus allows identification of the liquid type. Graph (c) shows that water was detected entering the segment at site station 1 and thereafter leaving the segment at site station 2. This is indicated by the change in sonic propagation velocity from that of oil to that of water.

Graph (d) shows the measured and computed liquid temperatures at site stations 1 and 2 as well as the ambient temperatures at each site station.

Turning now to FIG. 12, the various integration periods are shown for one site station. Similar tables are given for each site station. The threshold for the one minute period, as discussed with respect to FIG. 11, is 3 bbls. The Application Condition Factor or AppCon is a measure of the confidence in percent of the volume delta. The AppCon for the minute period is 67%. A leak warning is generated if the delta exceeds the threshold. A leak alarm is generated if the AppCon Delta, which is defined as the product of Delta and AppCon, here $0.397 \times 0.67 = 0.266$, for the one minute period, exceeds the threshold. As shown in FIG. 12, at the depicted site station, no leak warning or leak alarm is declared because the delta and AppCon Delta never exceeded the applicable threshold.

Other values, such as aeration, empty pipe, line packing, flow rate interface, etc. are also reported, as shown in FIG. 12.

Each segment is identified in regard to its dimensions, and materials, and liquid data is registered for all liquids known to flow in the pipeline. The liquid data includes all pertinent physical and thermodynamic properties, as may be required by the computation algorithms, detailed below, for the pipeline. The parameters of a hypothetical pipeline are illustrated in Table 2 below.

TABLE 2

| Pipe ID (inches) 12 | Liquid Expansion | Kfrict >> 1 |
|---|---|---|
| | | KL = 0.005 |
| Pipe Length (miles) 10 | Pipe Expansion | Kp = 0.001 |
| Pipe Capacity (BBLS) 7386 | Section Capacity | (BBLS) = 738.6 |
| Liquid type #, density d1 | Kinetic/Thermal > | Kf 2.60E-05 |
| 1    2    3    4 | Pipe/Ambient > | KPA = 0.01 |
| 0.7  0.8  0.9  1 | Thermal Inertia > | KTI = 0 |
| | Thermal Inertia decay | dKTI = 0 |

TABLE 3

| Time Min | Vfl f/s | Distance feet | Vv1 BBLS | Liquid 1 Type # | Tp1 Deg F | d1 SG | Liquid 2 Type # |
|---|---|---|---|---|---|---|---|
| 0 | 0.0 | 0 | 0.0 | 3 | 60.0 | 0.900 | 3 |
| 1 | 5.0 | 300 | 42.0 | 3 | 60.0 | 0.900 | 3 |
| 2 | 5.0 | 300 | 42.0 | 3 | 60.0 | 0.900 | 3 |
| 3 | 5.0 | 300 | 42.0 | 3 | 60.0 | 0.900 | 3 |

Definitions of Table 3 Column Headings

- Time: time of latest data report
- Vfl: Reported or computed flow velocity
- Distance: Distance liquid traveled since last data report
- Vv1: Volume entering pipeline segment
- Liquid 1: Liquid type entering pipeline segment
- Tp1: Measured temperature of liquid entering pipeline segment
- d1: Density of liquid entering site station 1
- Liquid 2: Type of liquid exiting at site station 2
- Ta1: Ambient temperature at site station 1
- Ta1.1: Ambient temperature at pipeline section 1
- Ta1.2: Ambient temperature at pipeline section 2
- Ta1.3: Ambient temperature at pipeline section 3
- Ta1.4: Ambient temperature at pipeline section 4
- Ta1.5: Ambient temperature at pipeline section 5
- Ta1.6: Ambient temperature at pipeline section 6
- Ta1.7: Ambient temperature at pipeline section 7
- Ta1.8: Ambient temperature at pipeline section 8
- Ta1.9: Ambient temperature at pipeline section 9
- Ta1 10: Ambient temperature at pipeline section 10
- Ta2: Ambient temperature at site station 2
- TL1.0- Assumed or measured temp. of liquid entering site sta. 1
- TL1.1 Computed temp. of liquid at pipeline section 1
- TL1.2 Computed temp. of liquid at pipeline section 2
- TL1.3 Computed temp. of liquid at pipeline section 3
- TL1.4 Computed temp. of liquid at pipeline section 4
- TL1.5 Computed temp. of liquid at pipeline section 5
- TL1.6 Computed temp. of liquid at pipeline section 6
- TL1.7 Computed temp. of liquid at pipeline section 7
- TL1.8 Computed temp. of liquid at pipeline section 8
- TL1.9 Computed temp. of liquid at pipeline section 9
- TL1.10 Computed temp. of liquid at pipeline section 10
- TL2c: Computed temp. of liquid at site station 2
- TL2: Measured temp. of liquid at site station 2
- dTL1.1 Computed change in section 1 temp. in last minute due to kinetic and radiation/conduction effects
- dTL1.2 Computed change in section 2 temp. in last minute due to kinetic and radiation/conduction effects
- dTL1.3 Computed change in section 3 temp. in last minute due to kinetic and radiation/conduction effects
- dTL1.4 Computed change in section 4 temp. in last minute due to kinetic and radiation/conduction effects
- dTL1.5 Computed change in section 5 temp. in last minute due to kinetic and radiation/conduction effects
- dTL1.6 Computed change in section 6 temp. in last minute due to kinetic and radiation/conduction effects
- dTL1.7 Computed change in section 7 temp. in last minute due to kinetic and radiation/conduction effects
- dTL1.8 Computed change in section 8 temp. in last minute due to kinetic and radiation/conduction effects
- dTL1.9 Computed change in section 9 temp. in last minute due to kinetic and radiation/conduction effects
- dTL1.10 Computed change in section 10 temp. in last minute due to kinetic and radiation/conduction effects
- dvp: Tot. change in pipeline vol. in this minute
- dVpL: Tot. change in pipeline liquid vol. in this minute
- Vv2: Measured volume output from site station 2
- dVL: Computed leak vol. this minute or report period
- 5 min: Average computed leak volume in last 5 minutes

TABLE 3-continued

- 15 min: Average computed leak volume in last 15 minutes
- 60 min: Average computed leak volume in last 60 minutes Detailed Description of Temperature Modeling Method-Introduction The temperature modeling method according to the invention is intended to enable computation of the incremental change in temperature of the liquid in the pipe at each of a designated number of equal volume segments along the pipeline. Based on the changes in temperature, the net expansion or contraction of the liquid in the pipe, and the expansion or contraction of the pipe itself can be computed.

The following factors are influential in the computations:

1) The local ambient temperature at each site station, and the thermal exchange coefficient between the liquid and ambient.
2) The local temperature of the pipewall itself, as influenced by both the ambient and liquid temperatures, is not considered an independent factor, as the relative mass of the pipewall as compared to the liquid it encloses is considered insignificant. If the ambient to the pipewall is affected by this energy exchange, as would be the case for an underground pipe which heated the soil surrounding it, the liquid temperature can be accommodated by accepting ambient data entry from some prior time cells. This would require saving some additional data, but only for a maximum of, say, 15 minutes.
3) The change in temperature of the liquid as kinetic energy is converted to thermal energy. It is expected that the liquid velocity and viscosity are factors in the potential temperature rise, and that the rate of conversion of kinetic energy to thermal energy applies equally, local viscosity considered, to all regions of the pipe, as all are flowing at essentially the same velocity.
4) The arrival of a defined volume of liquid at a designated temperature at a pipe section from the previous section of pipe will determine the new average temperature of that section of pipe, and therefore permit computation of its net expansion or contraction as it absorbs or radiates thermal energy into the ambient sink through the pipewall. The rate of thermal energy transfer is determined by the difference between its current temperature and ambient. It is not expected that diffusion of thermal energy between adjacent segments of liquid is an important factor.

Computation of Current Temperature at all Pipeline Sections

According to the temperature modelling method of the invention, all computations preferably are done once per minute, with the following sequence of computations:

At a given point in time, the following are known:
1) The ambient temperature at each section, computed by linear interpolation from the ambient temperature sensors at each of the adjacent site stations.
2) The liquid temperature at the input of the pipeline.
3) The liquid temperature at each section, based on historical computation as described below.
4) The initial temperature of liquid in all pipe sections, there being no prior information, is assumed to be equal to the current ambient temperature at each pipe section.
5) The loss/gain in temperature of each section of liquid by thermal energy transfer to/from ambient through the pipewall, in the last minute.
6) The intrinsic rise in temperature of the liquid due to the conversion of kinetic to thermal energy, in the last minute.
7) The proportional change in liquid temperature of each section due to arrival of new liquid at the temperature of the prior section and the loss of old liquid to the next section.

The minute time period is thus ended with a new set of initial conditions for the next minute's computations.

The thermal conversion factors can be obtained from a variety of sources:
a) Computations based on the thermodynamic considerations in combination with the thermal properties of the materials involved and their masses.
b) Actual test data from pipeline simulation "breadboards".
c) Correlation of computed site station pipewall temperature with actual pipeline data. A manual or automatic optimization of computation parameters can be implemented based on this type of historical data.

Computation of Thermal Expansion of Pipe and Liquid

Once per minute, a complete temperature profile of all sections of all segments of the pipeline is computed. The change in actual temperature of the liquid and pipewall can thus be computed. However, since at the input of the pipeline there is new liquid entering at an arbitrary temperature, which addition is only a factor in determining the radiation to/from ambient, it is essential to insure that the change in temperature computed is only that associated with radiation/conduction, and the conversion of kinetic energy to heat.

This is preferably done by computing the change in temperature of each section not from the difference between prior and present temperature, which includes the unacceptable effect of the new liquid's temperature, but from the kinetic and radiation equations only.

Once this computation is done for each section of pipe, the change in the volume of that section of pipewall and the change in volume of that section's volume of liquid are computed. An expansion of liquid is considered to have already expressed itself "instantly" in the measured flow volume for that minute of pipeline flow measurement. Therefore, an increase in liquid volume must be subtracted from that minute's measured flow volume output, $V_{v2}$. Conversely, an increase in the section's pipe volume must be subtracted from $V_{v2}$.

Once done, the net difference between each minute's $V_{v2}-V_{v1}$ computation is integrated and the net "leak" or "surfeit" quantity for each desired integration period determined.

FIG. 3B shows the steps implemented by the system in order to compensate the system for temperature effects. The system preferably includes the following steps:
1) Sensing the flow and temperature of the liquid $T_L$ entering and leaving a segment of a pipeline, where a segment is defined as that portion of the pipeline between the aforementioned site stations (step 100);
2) Sensing the ambient temperature $T_A$ of the pipe at each of the site stations whether the ambient to the pipe is that of air, water or soil, as in the case of a buried pipeline (step 200).
3) Expressing the effect of the measured ambient temperatures at each of the systematically determined number of defined equal volume sections of the aforementioned pipeline segment according to the topography of the segment of the pipeline, i.e., by description of whether each section of the segment is in air, water or soil (step 300).
4) Determining the effect of the prior temperature history of each section, determined by the segment topology to be soil, on its current and future ambient temperatures (step 400).
5) Determining the increase or decrease of the temperature of each section, due either to the interchange of thermal energy with the local section ambient, due to the conversion of liquid kinetic energy to thermal energy, using appropriate expressions of the thermodynamic relationships governing these processes (step 500).
6) Determining the type of liquid entering the pipe so as to determine the appropriate expansion coefficient (step 600).
7) Determining which section each type of liquid which entered the pipeline has reached, at any given time, so that the temperature change of each such section can utilize the appropriate liquid expansion coefficient to determine the change of liquid volume in each section due to the change in section temperature (step 700).
8) Determining the expansion or contraction of both the liquid and the pipe at each section, at least once per minute, due to the computed increase or decrease of temperature of the section in the last minute, utilizing the expansion coefficients which apply to the material of the pipe itself, and of the liquid which it contains at any given time (step 800).
9) Correcting the difference in measured volume of liquid entering and leaving the pipeline segment at least once per minute, by adding or subtracting the total aforementioned expansion or contraction of the liquid and pipe volume of all sections in the segment, during the same time period (step 900).
10) Computing the expected absolute temperature of each section of the segment, at least once per minute, using the computed increase or decrease of section temperature (step 1000).
11) Optimizing the parameters of the thermodynamic relationships utilized above, to assure the least difference between the computed temperature and the measured temperature of the one location in which such a measurement and computation can be compared, at the location of the temperature sensor toward which the liquid is flowing (step 1100).
12) Computing the thermal correction of net volume change of the pipeline segment and the liquid flowing in it, regardless of which direction the liquid is flowing (step 1200).

Using the Temperature Modelling Method as a Pipeline Leak Data Processor

The temperature simulation technique can be used to compute the possibility of a leak from actual data obtained from a pipeline. With reference to Tables 2 and 3, and the definitions relating to Table 3, above, in order to do this, the following are necessary:

1) Import Vv1 and Vv2 into the appropriate columns reserved for such data, with the data preferably in units of barrels per minute. Each data entry is thus equal to the volume of liquid which flowed in the last minute.
2) Assure that the data is lined up to the time column so that for the given day's data, 0 time is 12:00 midnight. Dependent on the capacity of the master station (or PC), the amount of data should be either for a full day, a half day (AM or PM), or 6 hour periods starting at 12 midnight.
3) Enter the pipeline parameters for the particular segment of pipeline, i.e., inner diameter, length, and where applicable, the number of sections into which that pipeline segment is divided.
4) Compute the linear flow velocity, Vf, in feet per second, in the appropriate column.
5) Enter the liquid temperature at the first site station, T1, in the column marked TL1o.
6) Enter the measured site station 2 liquid temperature, TL2, in the column marked T2. This will be compared to the computed liquid temperature, TL2c, to determine if the parameters used in the pipeline model are correct.
7) Enter the ambient site station 1 and site station 2 temperatures in the appropriate columns, Ta1 and Ta2. The system will then compute the ambient temperature at each section automatically.
8) The computed pipeline leak data will appear in the columns headed dVL, 5 Min, 15 Min and 60 Min.

Optimization

Optimization is the process of making the parameters chosen for the thermal transfer coefficients which compute the actual temperature history of the temperature T2 at site station 2 such that the computed T2 matches the measured T2 under all conditions of flow rate, T1, Ta1 and Ta2. Once this is done, there is reasonable assurance that the computed temperatures for each intermediate section of the pipeline are truly representative of actual conditions. This will assure that the computed liquid and pipe expansions or contractions are correct, and that the corrected Vv2, minus the measured Vv1, on which the computations are made effective, truly represents the net flow, independent of pipe or liquid expansion/contraction.

In addition, certain operating conditions may create uncertainty about the validity of the basic flow data itself. Particular among these conditions are operational Reynold's numbers in or near the transition region, the existence of aeration, or a drastic change in ambient conditions which could radically affect the thermal coupling coefficients, such as a sudden and pervasive rainstorm which affected the center of a pipe segment, but not either of the site stations.

1) Erroneous Reynold's Number

In the event that the flow is in the transition region, it is preferred that the first correction should be made for any known deviation in Reynold's number Rn from that which should apply. Then the correction for thermal conditions should be done. It may be necessary to iterate this process until it is deemed to have reached a limit. At that point, a determination of any remaining deviation of Rn should be made which could account for any remaining leak. If this assumption is deemed unreasonable, then the computed leak should be reported, but with a lower confidence factor than if the flow were in the turbulent region.

2) Aeration

Over some period of time it will be possible to correlate the reported effect of aeration detection value to the actual percentage of volume of liquid which it represents. When this level of confidence is reached, the lower level of confidence which must apply to any data reported under conditions of aeration may be increased somewhat. It may be necessary, for very high levels of aeration, to report a leak as being subject to severe skepticism.

3) Incorrect Thermal Parameters

Over a period of time it will be necessary to correct the initial thermal parameters to account for actual pipeline conditions. For example, if Kf is too high, then the actual pipeline temperature will be lower than that computed. If it is correct for some liquids, but not others, then it may be assumed that the viscosity component of that parameter is either too high or too low, dependent on which direction the error is found.

In addition, if the measured temperature is consistently more responsive to ambient temperature than the effect computed, it will be necessary to correct KPA. And if KPA appears to be correct for some range of pipe diameters, and not for others, then it may be necessary to correct the presently assumed inverse relationship. In addition, if there appears to be a lag in response to changes in ambient, it may be necessary to invoke a "thermal inertia" by adding "prior history" terms to the computation of section ambient temperatures from those measured at the site stations.

The system permits adjustment for actual measured temperatures, as may be found due to local geographic conditions, such as when passing through rivers, or over mountains.

4) Correction of Liquid Parameters

Since both the liquid viscosity and its coefficient of temperature expansion are factors in leak computation, it is essential that these parameters be as correct as possible. In cases where the only explanation for a verified error in leak computation is an error in the liquid parameters, the determination of what the particular parameters should have been is essential. In such cases, correction of data in the data bank should be made, with appropriate traceable notation.

In some cases, transient conditions, such as exist during interface passage, may make reporting of a leak, or masking of a leak, uncertain. It should be considered that if means is necessary to deal with liquid data parameter error under these conditions, then it should be given priority. However, if such conditions exist, then a lower confidence rating should be given to the current leak status report, even if it does not show a leak, but might be masking it.

A means of automatically analyzing data to determine the probable cause, or causes, of a lack of correlation between the computed temperature of the liquid at the second site station, TL2c, and the measured TL2, is also possible. This is because the "error" signal which results from the difference between this computed segment liquid exit temperature and the measured exit temperature permit a feedback correlation study of the known data reports for any given data integration period. Thus a "smart" or self learning system would result.

Development of an Artificial Intelligence

It is known that pipeline conditions, and their effect on computed volume difference of flow in any pipeline segment, are subject to a wide variety of variations and combinatorial situations. As such there may be periods during which these conditions cause the appearance of a leak, rather than the actuality of there being a leak. The resultant false alarms must be avoided to prevent deterioration of the confidence of the operating staff in the system.

The system of the invention contains a means of conditioning the reported leak data with the operating staff's opinion as to the degree of validity of data during periods when operating conditions are less than ideal. This is done by an algorithm which produces a dimensionless number, based on the individual operating conditions which are included in the algorithm, which is multiplied with the "raw" difference data to produce the difference data used for alarm purposes. The number produced by this algorithm is called the application condition factor, or AppCon for short, and is a measure of the confidence that the system has in the leak data being accurate under the current operating conditions.

Now, the source factors which are included in the AppCon algorithm are:

Site Station Fault Alarm
Site Station Empty Alarm
Site Station Aeration condition
Flow Rate and Duration
Line Pack indication
Interface Passage indication
Thermal unbalance
Liquid condition The AppCon algorithm includes assigned weighting factors for each of these items, and permits the operator to change these weighting factors so that the resultant AppCon factor suppress a false leak indication, if such has been detected and traced to a particular source factor. Thus, the operator has the opportunity to adjust these weighting factors to respond to the "personality" of the pipeline, and to his judgment of how the system should interpret data received during such periods of time.

Once expressed, the operator's judgment will be carried out automatically at all future times, applying the AppCon factor to adjust leak data in just the way he would have done personally if he were present at all times. Thus the occurrence of false alarms will be suppressed, and the confidence in the declaration of an actual alarm will be greatly respected.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. Apparatus for detecting a leak in an elongated fluid conducting pipe, said apparatus comprising at least first and second flowmeter means for measuring an amount of fluid per unit time flowing within said pipe; said first and second flowmeter means coupled to said pipe at axially spaced locations with said second flowmeter means being downstream of said first flowmeter means; measurement means for determining a total amount of fluid flowing through said pipe at each of said locations for equivalent periods of time; comparison means coupled to said measurement means for comparing the total flow amounts at said first and second locations for said equivalent periods of time and for producing a volume difference value; and output means operable in response to a predetermined volume difference value from said comparison means, and further comprising means for determining the temperature of fluid at said first and second flowmeter means, and means for correcting the flow amount determined at said second location to compensate said difference value for effects of temperature on the entire pipeline.

2. The apparatus recited in claim 1, wherein said flowmeter means comprises clamp-on transducers clamped onto the outer surface of said pipe for measuring the transit time for ultrasonic energy to traverse the fluid in said pipe.

3. Apparatus for detecting a leak in an elongated fluid conducting pipe, said apparatus comprising at least first and second flowmeter means for measuring an amount of fluid per unit time flowing within said pipe; said first and second flowmeter means coupled to said pipe at axially spaced locations with said second flowmeter means being downstream of said first flowmeter means; measurement means for determining a total amount of fluid flowing through said pipe at each of said locations for equivalent periods of time; comparison means coupled to said measurement means for comparing the total flow amounts at said first and second locations for said equivalent periods of time and for producing a volume difference value: output means operable in response to a predetermined volume difference value from said comparison means, and further comprising means for determining the temperature of fluid at said first and second flowmeter means, and further including a plurality of additional flowmeter means disposed along the length of said pipe; each of said plurality of flowmeter means having outputs which are provided to said measurement means for measuring the total amount of fluid in said pipe at each of said locations for equivalent periods of time; said comparison means being coupled to said measurement means for comparing the total flow amounts at any two locations for said equivalent periods of time and for producing a volume difference value, and said output means being operable in response to exceeding a predetermined volume difference value from any two locations from said comparison means.

4. The apparatus recited in claim 3, wherein said flowmeter means are clamp-on transducers clamped onto the outer surface of said pipe for measuring the transit time for ultrasonic energy to traverse the fluid in said pipe.

5. The apparatus recited in claim 3, further comprising means for determining the temperature of fluid at each of said flowmeter means, and means for measuring the ambient temperature at each of said flowmeter means, and further comprising means for correcting the flow amount determined at each of said locations to compensate said volume difference value for effects of temperature.

6. The apparatus recited in claim 3, wherein said measurement means comprise integration means for accumulating flow amount totals for fluid flow past each location for a preset period of time.

7. The apparatus recited in claim 6, wherein said preset period of time comprises a group of preset periods of time.

8. The apparatus recited in claim 7, wherein said group of preset periods of time comprise one minute, five minute, fifteen minute and one hour periods.

9. The apparatus recited in claim 6, wherein said integration means comprises means for updating said totals periodically.

10. The apparatus recited in claim 9, wherein said totals are updated every minute, with the oldest data being deleted in favor of new data.

11. The apparatus recited in claim 3, wherein said total flow amounts comprise mass amounts.

12. A method for detecting a leak in an elongated fluid conducting pipe, said method comprising measuring an amount of flow of fluid per unit time flowing within said pipe at axially spaced locations with a second location being downstream of a first location; determining the total flow amount of said fluid in said pipe at each of said locations for equivalent periods of time; comparing the total flow amounts at said first and second locations for said equivalent periods of time and producing a volume difference value; and generating an output in response to a predetermined volume difference value; and further comprising measuring the temperature of fluid at said first and second locations and correcting the flow amount determined at the second location to compensate said volume difference value for effects of temperature on the entire pipeline.

13. The method recited in claim 12, wherein said step of measuring the amount of flow per unit time comprises providing clamp-on transducers on the outer surface of said pipe and measuring the transit time for ultrasonic energy to traverse the fluid in said pipe.

14. A method for detecting a leak in an elongated fluid conducting pipe, said method comprising measuring an amount of flow of fluid per unit time flowing within said pipe at axially spaced locations with a second location being downstream of a first location; determining the total flow amount of said fluid in said pipe at each of said locations for equivalent periods of time; comparing the total flow amounts at said first and second locations for said equivalent periods of time and producing a volume difference value; generating an output in response to a predetermined volume difference value; and further including providing a plurality of additional locations along the length of said pipe; measuring the amount of said fluid flow per unit time in said pipe at each of said locations; determining the total flow amounts at each of said locations for equivalent periods of time; comparing the flow amounts at said first and second locations for said equivalent periods of time and producing a volume difference value; and providing an output in response to exceeding a predetermined volume difference value.

15. The method recited in claim 14, wherein said step of measuring the amount of flow per unit time comprises providing clamp-on transducers on the outer surface of said pipe and measuring the transit time for ultrasonic energy to traverse the fluid in said pipe.

16. The method recited in claim 14, further comprising determining the temperature of fluid at each of said locations and measuring the ambient temperature at each of said locations, and further comprising correcting the flow amount determined at each of the locations to compensate said volume difference value for effects of temperature.

17. The method recited in claim 14, wherein said step of determining the total flow amount comprises integrating flow amount totals for fluid flow past each location for a preset period of time.

18. The method recited in claim 17, wherein said preset period of time comprises a group of preset periods of time.

19. The method recited in claim 18, wherein said group of preset periods of time comprise one minute, five minute, fifteen minute and one hour periods.

20. The method recited in claim 17, wherein said step of integrating comprises updating said totals periodically.

21. The method recited in claim 20, wherein said totals are updated every minute, with the oldest data being deleted in favor of new data.

22. The method recited in claim 14, wherein said total flow amounts comprise mass amounts.

23. A method of leak detection for a pipeline, comprising the steps of:
dividing the pipeline into a plurality of segments, a first site station provided at the beginning of each segment and a second site station provided at the end of each segment;
dividing each segment of the pipeline into a plurality of hypothetical pipeline sections, each section having the same nominal volume;
measuring the liquid flow into the first section and determining a volume of liquid that has passed the first site station for a defined period;
measuring the temperature of the liquid entering the first section at the first site station;
measuring the liquid flow out of the last pipeline section of the segment and determining a volume of liquid that has passed the second site station for the defined period;
measuring the temperature of the liquid leaving the last section at the second site station;
measuring the temperature of the ambient to the pipeline at the first site station or that representative of the topography of the segment;
measuring the temperature of the ambient to the pipeline at the second site station or that representative of the topography of the segment;
computing the effect of the measured ambient temperatures at the first and second site stations on the sections intermediate the first and second site stations;
computing the change in temperature of each section intermediate the first and second site stations due to conversion of kinetic energy into thermal energy and radiation and conduction of energy to or from the section;
computing the change in volume of each section of pipeline wall and the change in volume of the liquid in each section based on the computed change in temperature of each section;
determining the difference in measured volume between the volumes determined that have passed the first and second site stations for the defined period;
correcting the difference in measured volume between the first and second site stations by adding or subtracting the change in the liquid and pipeline wall volume of all sections of the segment during the defined time period;
comparing the corrected difference in measured volume between the first and second site stations with a threshold level; and
generating an alarm signal if the difference exceeds said threshold level.

24. The method recited in claim 23, wherein the steps of measuring the liquid flow at the first and second site stations comprises providing a clamp-on ultrasonic transit-time flowmeter at each site station for injecting a sonic beam into the liquid for measuring the liquid flow in the pipeline at each respective site station non-intrusively.

25. The method recited in claim 24, wherein the step of providing a clamp-on ultrasonic flowmeter comprises providing a wide-beam flowmeter.

26. The method recited in claim 24, further comprising the step of identifying the presence of free gas or water in the liquid at each site station, and providing an indication of the presence of said free gas or water.

27. The method recited in claim 26, wherein the step of identifying the presence of free gas comprises measuring the variation of sonic propagation velocity due to scattering of the sonic beam caused by included free gas in the liquid at the site station.

28. The method recited in claim 26, wherein the step of identifying the presence of free gas comprises measuring a received signal strength of the sonic beam and comparing the received signal to a reference value for the liquid at the site station.

29. The method recited in claim 28, further comprising measuring variation in amplitude over time of said sonic beam to determine the presence of free gas in the liquid at the site station.

30. The method recited in claim 24, further comprising the step of identifying an interface between liquids of two different types at a site station.

31. The method recited in claim 30, wherein the step of identifying an interface comprises measuring the temperature and the sonic propagation velocity of the liquid at the site station during a time period when an interface between liquids is passing through the pipeline at the site station.

32. The method recited in claim 31, further comprising using the identified interface to determine the end of a first liquid product batch and the beginning of a second liquid product batch in the pipeline.

33. The method recited in claim 32, further comprising computing mass flow through the pipeline at a plurality of site stations and comparing the determined mass flow at each of the site stations from the passage of a first interface to the passage of a second interface to determine if a leak has occurred.

34. The method recited in claim 24, wherein the step of providing a clamp-on flowmeter comprises providing a multi-path sonic meter to minimize flow profile effects due to bends in the pipeline.

35. The method recited in claim 24, further comprising identifying the presence of a pig in the pipeline at a site station by the interruption of the sonic beam for a period of time defined by a dimension of the pig in the longitudinal extent of the pipeline.

36. The method recited in claim 24, further comprising identifying the presence of water in the liquid at a site station by measuring a defined change in sonic propagation velocity from that of the liquid to that of water at the site station.

37. The method recited in claim 24, further comprising measuring the sonic propagation velocity of the liquid in the pipeline at each site station, determining if a change in sonic propagation velocity has occurred at least two site stations and recording the time of such change at said two site stations, and using a difference in the recorded times at said two site stations to determine the location of a leak.

38. The method recited in claim 23, wherein the steps of measuring the liquid temperature at the first and second site stations comprise providing a clamp-on temperature sensor at the respective site station to measure the liquid temperature.

39. The method recited in claim 23, wherein the step of computing the effects of the ambient temperature at each section comprises interpolating the ambient temperature at each section from the respective ambient temperatures at each site station.

40. The method recited in claim 39, wherein the step of computing the effect of ambient temperature of the first and second site stations on each section comprises determining the topography of the segment.

41. The method recited in claim 40, wherein the step of determining the topography of a segment comprises determining if each section of the segment is disposed in air, water or soil.

42. The method recited in claim 41, further comprising the step of determining the effect of prior temperature history of each section, if the section is disposed in soil, on current and future ambient temperatures.

43. The method recited in claim 23, wherein said step of computing the change in volume of the liquid and the pipe comprises performing said step of computing for a defined period of time.

44. The method recited in claim 43, wherein said steps of computing and correcting are performed periodically for said defined period of time, with results of said step of correcting being accumulated over multiple ones of said period of time.

45. The method recited in claim 44, further comprising comparing said results to threshold values assigned to said multiple periods of time, and generating an alarm if the result exceeds the threshold for any one of the time periods.

46. The method recited in claim 45, further comprising the step of performing said steps of computing and correcting for a plurality of different defined periods of time.

47. The method recited in claim 46, further comprising providing threshold values for each of said different defined periods of time, comparing results of said step of correcting to said threshold values, and generating an alarm if the results exceed the threshold value for any one of the periods.

48. The method recited in claim 46, wherein the plurality of different periods of time comprise one minute, five minute, fifteen minute and one hour periods of time.

49. The method recited in claim 23, further comprising computing an expected absolute temperature of each section intermediate the first and second site stations using the computed change in temperature of each section and comparing the measured liquid temperature at the second site station with the computed temperature at the second site station, and correcting the temperature computed at each of the sections based on a difference between the computed temperature and the measured temperature of the liquid at the second site station.

50. The method recited in claim 49, further comprising optimizing thermodynamic equations defining liquid temperature change for each section in accordance with said step of comparing the measured and computed liquid temperatures at the second site station.

51. The method recited in claim 23, further comprising transferring data from each site station to a master station via a high speed data communications link.

52. The method recited in claim 51, further comprising polling the site station from the master station.

53. The method recited in claim 23, further comprising identifying the liquid at each site station by determining sonic propagation velocity of the liquid and the temperature of the liquid at each site station, said sonic propagation velocity and temperature defining a unique curve for each liquid allowing identification of the liquid, and identifying the liquid based on the unique curve corresponding to the determined sonic propagation velocity and temperature.

54. The method recited in claim 53, further comprising determining an appropriate liquid expansion coefficient once the liquid is identified for determining the change in liquid volume based on the change in temperature of each section.

55. The method recited in claim 54, further comprising determining that section which each type of liquid in the pipeline has reached, so that the appropriate liquid expansion coefficient can be used to determine the change of liquid volume in each section due to the change in section temperature.

56. The method recited in claim 53, further comprising storing in advance parameters relating to a plurality of different liquids carried by said pipeline, and using said prestored parameters to identify the liquid in the pipeline by comparing said prestored parameters to actual measured parameters.

57. The method recited in claim 56, wherein the measured and prestored parameters include sonic propagation velocity versus temperature.

58. The method recited in claim 57, wherein the prestored parameters include density and/or viscosity versus temperature.

59. Leak detection apparatus for a pipeline, comprising:
   means dividing the pipeline into a plurality of segments, said dividing means comprising a first site station provided at the beginning of each segment and a second site station provided at the end of each segment;
   each segment of the pipeline being divided into a plurality of hypothetical pipeline sections, each section having the same nominal volume;
   means for measuring the liquid flow into the first section and for determining a volume of liquid that has passed the first site station for a defined period;
   means for measuring the temperature of the liquid entering the first section at the first site station;
   means for measuring the liquid flow out of the last pipeline section of the segment and for determining a volume of liquid that has passed the second site station for the defined period;
   means for measuring the temperature of the liquid leaving the last section at the second site station;
   means for measuring the temperature of the ambient to the pipeline at the first site station or that representative of the topography of the segment;
   means for measuring the temperature of the ambient to the pipeline at the second site station or that representative of the topography of the segment;
   means for computing the effect of the measured ambient temperatures at the first and second site stations on each of the sections intermediate the first and second site stations;
   means for computing the change in temperature of each section intermediate the first and second site stations due to conversion of kinetic energy into thermal energy and radiation and conduction of energy to or from the section;
   means for computing the change in volume of each section of pipeline wall and the change in volume of the liquid in each section based on the computed change in temperature of each section;
   means for determining the difference in measured volume between the volumes determined that have passed the first and second site stations for the defined period;
   means for correcting the difference in measured volume between the first and second site stations by adding or subtracting the change in the liquid and pipeline wall volume of all sections of the segment during the defined time period;
   means for comparing the corrected difference in volume between the first and second site stations with a threshold level; and
   means for generating an alarm signal if the difference exceeds said threshold level.

60. The apparatus recited in claim 59, wherein the means for measuring the liquid flow at the first and second site stations comprises a clamp-on ultrasonic transit-time flowmeter at each site station for injecting a sonic beam into the liquid for measuring the liquid flow in the pipeline at each respective site station nonintrusively.

61. The apparatus recited in claim 60, wherein the clamp-on ultrasonic flowmeter comprises a wide-beam flowmeter.

62. The apparatus recited in claim 60, wherein said means for computing the change in volume of the liquid and the pipeline wall comprise means for computing for a defined period of time.

63. The apparatus recited in claim 62, wherein the means for computing and correcting comprise means for periodically computing for said defined periods of time, with results from said means for correcting being accumulated over multiple ones of said period of time.

64. The apparatus recited in claim 63, further comprising means for comparing said results to threshold values assigned to said multiple periods of time, and means for generating an alarm if the result exceeds the threshold for any one of the periods of time.

65. The apparatus recited in claim 64, further comprising means for performing said steps of computing and correcting for a plurality of different periods of time.

66. The apparatus recited in claim 65, further comprising means for providing threshold values for each of said different defined periods of time, said means for comparing comprising means for comparing said difference to said threshold values, and generating an alarm if the results exceed the threshold value for any one of the periods.

67. The apparatus recited in claim 65, wherein the plurality of different periods of time comprise one minute, five minute, fifteen minute and one hour periods of time.

68. The apparatus recited in claim 63, further comprising means for identifying the presence of free gas or water in the liquid at each site station, and means for providing an indication of the presence of said free gas or water.

69. The apparatus recited in claim 68, wherein the means for identifying the presence of free gas comprises means for measuring a received signal strength of the sonic beam and means for comparing the received signal to a reference value for the liquid at the site station.

70. The apparatus recited in claim 69, further comprising means for measuring variation in amplitude over time of said sonic beam to determine the presence of free gas in the liquid at the site station.

71. The apparatus recited in claim 63, wherein the means for identifying the presence of free gas comprises means for measuring variation of sonic propagation velocity due to scattering of the sonic beam caused by included free gas in the liquid at the site station.

72. The apparatus recited in claim 60, wherein the clamp-on flowmeter comprises a multi-path sonic meter to minimize flow profile effects due to bends in the pipeline.

73. The apparatus recited in claim 72, further comprising means for polling the site station from the master station.

74. The apparatus recited in claim 60, further comprising means for measuring the sonic propagation velocity of the liquid in the pipeline at each site station, means for determining if a change in sonic propagation velocity has occurred at least two site stations and means for recording the time of such change at said two site stations, and means for using a difference in the recorded times at said two site stations to determine the location of a leak.

75. The apparatus recited in claim 59, wherein the means for measuring the liquid temperature at the first and second site stations each comprise a clamp-on temperature sensor at the respective site station to measure the liquid temperature.

76. The apparatus recited in claim 59, wherein the means for computing the effect of the ambient temperature at each section comprises means for interpolating the ambient temperature at each section from the respective ambient temperatures at each site station.

77. The apparatus recited in claim 76, wherein the means for computing the effect of ambient temperature at the first and second site stations on each section comprises means for determining the topography of the segment.

78. The apparatus recited in claim 77, wherein the means for determining the topography of the segment comprises means for determining if each section of the segment is disposed in air, water or soil.

79. The apparatus recited in claim 78, further comprising means for determining the effect of prior temperature history of each section, if the section is disposed in soil, on current and future ambient temperatures.

80. The apparatus recited in claim 59, further comprising means for identifying an interface between liquids of two different types at a site station.

81. The apparatus recited in claim 80, wherein the means for identifying an interface comprises means for measuring the temperature and the sonic propagation velocity of the liquid at the site station during a time period when an interface between liquids is passing through the pipeline at the site station.

82. The apparatus recited in claim 81, further comprising means for using the identified interface to determine the end of a first liquid product batch and the beginning of a second liquid product batch.

83. The apparatus recited in claim 82, further comprising means for computing the mass flow through the pipeline at a plurality of site stations and means for comparing the determined mass flow at each of the site stations from the passage of a first interface to the passage of a second interface to determine if a leak has occurred.

84. The apparatus recited in claim 59, further comprising means for computing an absolute temperature of each section intermediate the first and second site stations using the computed change in temperature of each section and means for comparing the measured liquid temperature at the second site station with the computed temperature at the second site station, and means for correcting the temperature computed at each of the sections based on a difference between the computed temperature and the measured temperature of the liquid at the second site station.

85. The apparatus recited in claim 84, further comprising means for optimizing thermodynamic equations defining the liquid temperature change for each section in accordance with said means for comparing the measured and computed liquid temperature at the second site station.

86. The apparatus recited in claim 59, further comprising means for transferring data from each site station to a master station via a high speed data communications link.

87. The apparatus recited in claim 59, further comprising means for identifying the liquid at each site station by determining the sonic propagation velocity of the liquid and the temperature of the liquid at each site station, said sonic propagation velocity and temperature defining a unique curve for each liquid allowing identification of the liquid, said means for identifying comprising means identifying the liquid based on the unique curve corresponding to the determined sonic propagation velocity and temperature.

88. The apparatus recited in claim 87, further comprising means for storing in advance parameters relating to a plurality of different liquids carried by said pipeline, and means using said prestored parameters to identify the liquid in the pipeline by comparing said prestored parameters to actuate measured parameters.

89. The apparatus recited in claim 88, wherein the measured and prestored parameters include sonic propagation velocity versus temperature.

90. The apparatus recited in claim 89, wherein the prestored parameters include density and/or viscosity versus temperature.

91. The apparatus recited in claim 59, further comprising means for identifying the presence of a pig in the pipeline at a site station comprising means for determining the interruption of the sonic beam for a period of time defined by a dimension of the pig in the longitudinal extent of the pipeline.

92. The apparatus recited in claim 59, further comprising means for identifying the presence of water in the liquid at a site station comprising means for measuring a defined change in sonic propagation velocity from that of the liquid to that of water at the site station.

* * * * *